(12) United States Patent
Hejazi et al.

(10) Patent No.: US 11,140,603 B2
(45) Date of Patent: Oct. 5, 2021

(54) EVOLUTIONARY ALGORITHMS FOR GEOGRAPHIC LOAD BALANCING USING A DISTRIBUTED ANTENNA SYSTEM

(71) Applicant: DALI WIRELESS, INC., Menlo Park, CA (US)

(72) Inventors: Seyed Amin Hejazi, Burnaby (CA); Shawn Patrick Stapleton, Vancouver (CA)

(73) Assignee: DALI WIRELESS, INC., Menlo Park, CA (US)

(*) Notice: Subject to any disclaimer, the term of this patent is extended or adjusted under 35 U.S.C. 154(b) by 0 days.

(21) Appl. No.: 16/733,052

(22) Filed: Jan. 2, 2020

(65) Prior Publication Data

US 2020/0187077 A1 Jun. 11, 2020

Related U.S. Application Data

(60) Continuation of application No. 15/782,309, filed on Oct. 12, 2017, which is a continuation of application
(Continued)

(51) Int. Cl.
*H04W 36/22* (2009.01)
*H04W 28/08* (2009.01)
(Continued)

(52) U.S. Cl.
CPC .......... *H04W 36/22* (2013.01); *H04W 24/08* (2013.01); *H04W 28/08* (2013.01); *H04W 36/30* (2013.01); *H04W 40/14* (2013.01); *H04W 88/085* (2013.01)

(58) Field of Classification Search
USPC ..... 455/417, 423–425, 436–455, 561, 562.1, 455/422.1, 429
See application file for complete search history.

(56) References Cited

U.S. PATENT DOCUMENTS 7,286,507 B1 10/2007 Oh et al.
9,148,839 B2 9/2015 Hejazi et al.
(Continued)

FOREIGN PATENT DOCUMENTS

JP 2007-166353 A 6/2007
JP 2007-520170 A 7/2007
(Continued)

OTHER PUBLICATIONS

Lee et al., A Dynamic Sectorization of Microcells for Balanced Traffics in CDMA: Genetic Algorithms Approach, In: IEEE Transactions on Vehicular Technology, vol. 51, issue 1, pp. 63-72, Jan. (Year: 2002).*
(Continued)

*Primary Examiner* — Suhail Khan
(74) *Attorney, Agent, or Firm* — Artegis Law Group, LLP

(57) ABSTRACT

Methods and apparatuses are presented for balancing non-uniformly distributed network traffic in a wireless communications system having a plurality of digital remote units (DRUs). In some embodiments, a method comprises partitioning the plurality of DRUs into a plurality of DRU sectors, and dynamically repartitioning the plurality of DRU sectors depending on traffic conditions in at least one of the DRU sectors, such that the repartitioning satisfies at least one of a soft capacity constraint or a hard capacity constraint. The dynamic repartitioning may be based on at least one optimization algorithm.

16 Claims, 10 Drawing Sheets

Related U.S. Application Data

No. 14/837,850, filed on Aug. 27, 2015, now Pat. No. 9,854,494, which is a division of application No. 13/770,113, filed on Feb. 19, 2013, now Pat. No. 9,148,839.

(60) Provisional application No. 61/600,530, filed on Feb. 17, 2012.

(51) Int. Cl.
| | | |
|---|---|---|
| *H04W 24/08* | (2009.01) | |
| *H04W 40/14* | (2009.01) | |
| *H04W 36/30* | (2009.01) | |
| *H04W 88/08* | (2009.01) | |

(56) References Cited

U.S. PATENT DOCUMENTS

| | | | |
|---|---|---|---|
| 9,854,494 B2 | 12/2017 | Hejazi et al. | |
| 2005/0176419 A1 | 8/2005 | Triol et al. | |
| 2005/0256963 A1 | 11/2005 | Proctor, Jr. et al. | |
| 2005/0286448 A1 | 12/2005 | Proctor, Jr. et al. | |
| 2007/0077929 A1* | 4/2007 | Chen | H04W 16/06 455/445 |
| 2007/0142057 A1 | 6/2007 | Murakami et al. | |
| 2010/0035600 A1 | 2/2010 | Hou et al. | |
| 2010/0061291 A1 | 3/2010 | Wala | |
| 2010/0075682 A1 | 3/2010 | del Rio-Romero et al. | |
| 2010/0248737 A1* | 9/2010 | Smith | H04W 16/12 455/452.2 |
| 2012/0039254 A1 | 2/2012 | Stapleton et al. | |
| 2013/0039254 A1 | 2/2013 | Kim et al. | |
| 2013/0258995 A1* | 10/2013 | Skov | H04W 72/0406 370/329 |
| 2018/0160356 A1 | 6/2018 | Hajazi et al. | |

FOREIGN PATENT DOCUMENTS

| | | | |
|---|---|---|---|
| JP | 2013-541875 A | 11/2013 | |
| WO | WO 2013/123494 | 8/2013 | |

OTHER PUBLICATIONS

Kim, Sung-Soo et al. "Dynamic Load Balancing Using an Ant Colony Approach in Micro-Cellular Mobile Communications Systems" Advances in Metaheuristics for Hard Optimization; Series 2008; pp. 137-152.
Lee, Chae Y. et al. "A Dynamic Sectorization of Microcells for Balanced Traffic in CDMA: Genetic Algorithms Approach" IEEE Transactions on Vehicular Technology, vol. 51, No. 1, Jan. 2002.
Yum, Tak-Shing Peter et al. "Hot-Spot Traffic Relief in Cellular Systems" IEEE Journal on Selected Areas in Communications; vol. II, No. 6, Aug. 6, 1993.
International Search Report for International Application No. PCT/US2013/026647, dated Apr. 24, 2013.
Written Opinion for International Application No. PCTIUS2013/026647, dated Apr. 24, 2013.
International Preliminary Report on Patentability for International Application No. PCT/US20131026647, dated Aug. 28, 2014.
Office Action (Including Translation) for Brazilian Application No. 1120140203059, dated Jun. 9, 2020.
First Office Action (Including Translation) for Chinese Patent Application No. 201380009723.1, dated Jun. 19, 2017.
Notice of Decision to Grant (Including Translation) for Chinese Patent Application No. 201380009723.1, dated Jan. 30, 2018.
European Search Report for European Patent Application No. 13749837.4, dated Aug. 28, 2015.
Intent to Grant for European Patent Application No. 13749837.4, dated Mar. 10, 2017.
European Search Report for European Patent Application No. 17185342.7, dated Oct. 30, 2017.
Office Action for European Patent Application No. 17185342.7, dated Apr. 18, 2019.
Office Action for European Patent Application No. 17185342.7, dated Mar. 10, 2020.
Office Action for Israel Patent Application No. 233975, dated Nov. 13, 2016.
Office Action for Israel Patent Application No. 233975, dated Apr. 24, 2017.
Notice of Acceptance for Israel Patent Application No. 233975, dated Jan. 22, 2018.
Examination Report for Indian Patent Application No. 6777/DELNP12014, dated Feb. 27, 2019.
Notice of Reasons for Refusal (Including Translation) for Japanese Patent Application No. 2014-557866, dated Feb. 24, 2017.
Decision to Grant a Patent (Including Translation) for Japanese Patent Application No. 2014-557866, dated Mar. 6, 2018.
Notification of Reason for Refusal (Including Translation) for Korean Application No. 10-2014-7025637, dated Apr. 3, 2019.
Notification of Final Rejection (Including Translation) for Korean Application No. 10-2014-7025637, dated Nov. 6, 2019.
Office Action (Restriction Requirement) for U.S. Appl. No. 13/770,113, dated Oct. 16, 2014.
Office Action for U.S. Appl. No. 13/770,113, dated Jan. 7, 2015.
Notice of Allowance for U.S. Appl. No. 13/770,113, dated May 26, 2015.
Office Action for U.S. Appl. No. 14/837,850 dated Oct. 13, 2016.
Notice of Allowance for U.S. Appl. No. 14/837,850 dated Jul. 12, 2017.
Office Action for U.S. Appl. No. 15/782,309 dated Jun. 21, 2018.
Office Action for U.S. Appl. No. 15/782,309 dated Jan. 14, 2019.

* cited by examiner

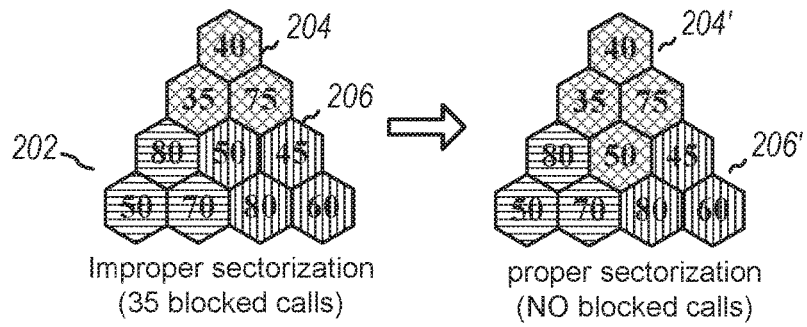
FIG. 2A  Improper sectorization (35 blocked calls)
FIG. 2B  proper sectorization (NO blocked calls)
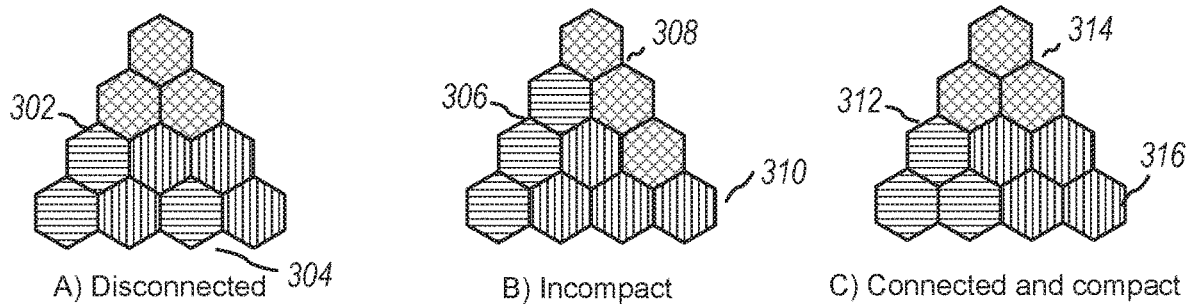
A) Disconnected   B) Incompact   C) Connected and compact
FIG. 3
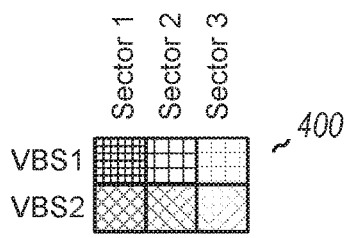
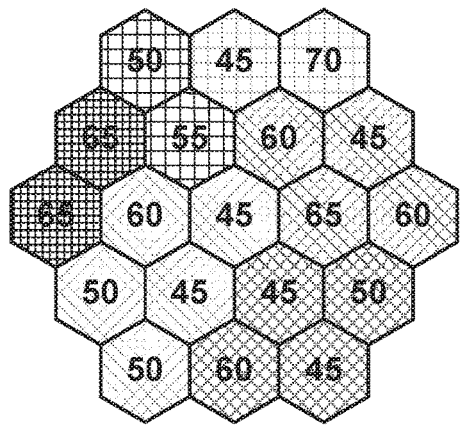
FIG. 4A
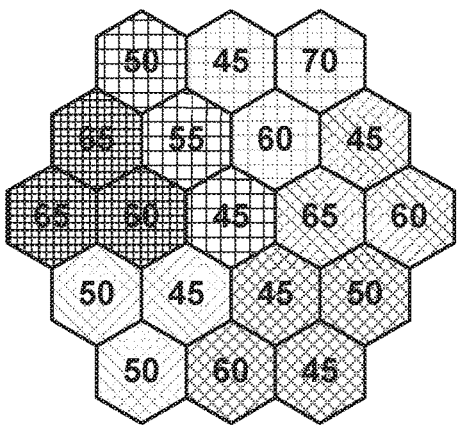
FIG. 4B

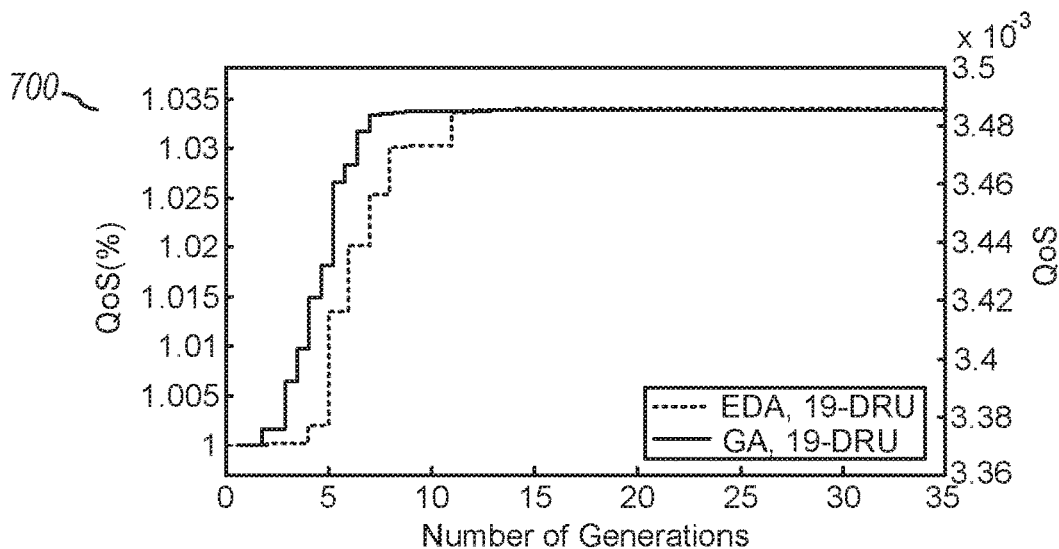
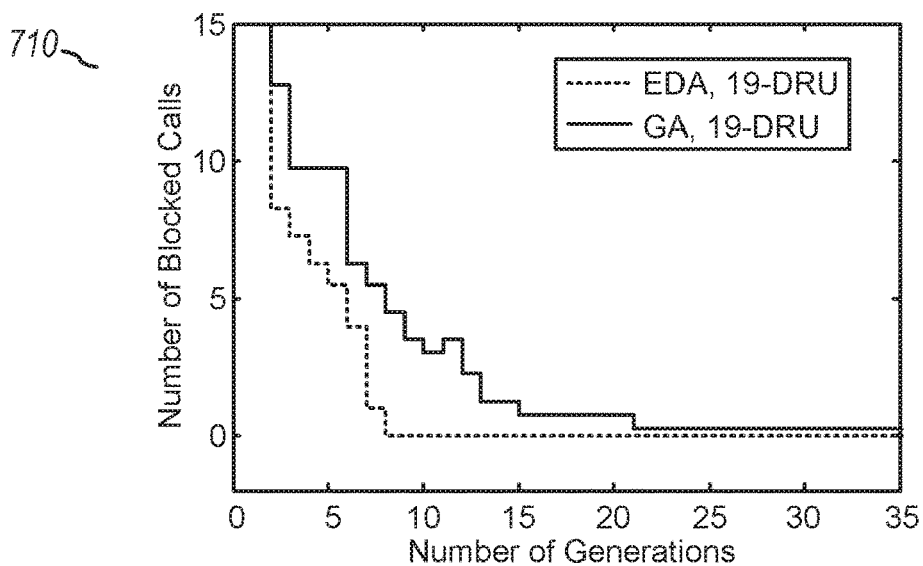
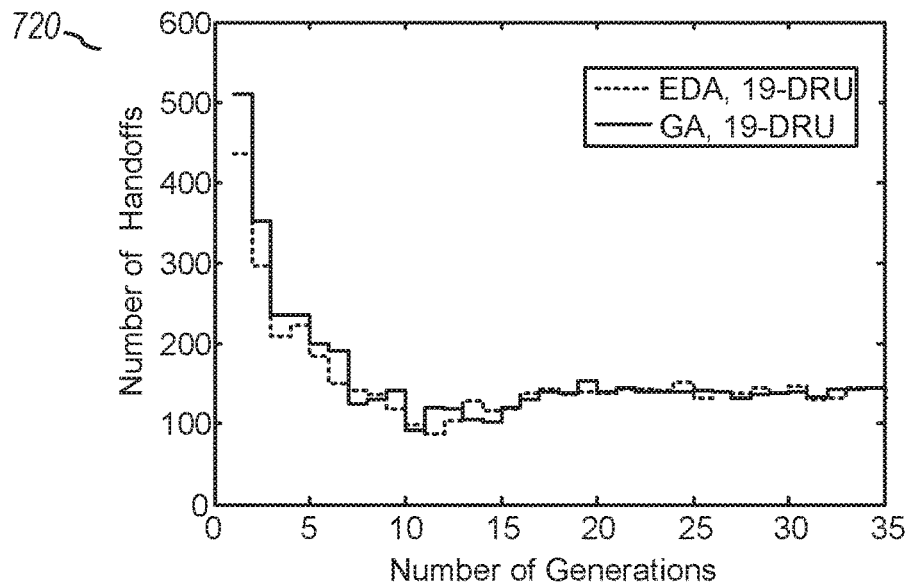
FIG. 7

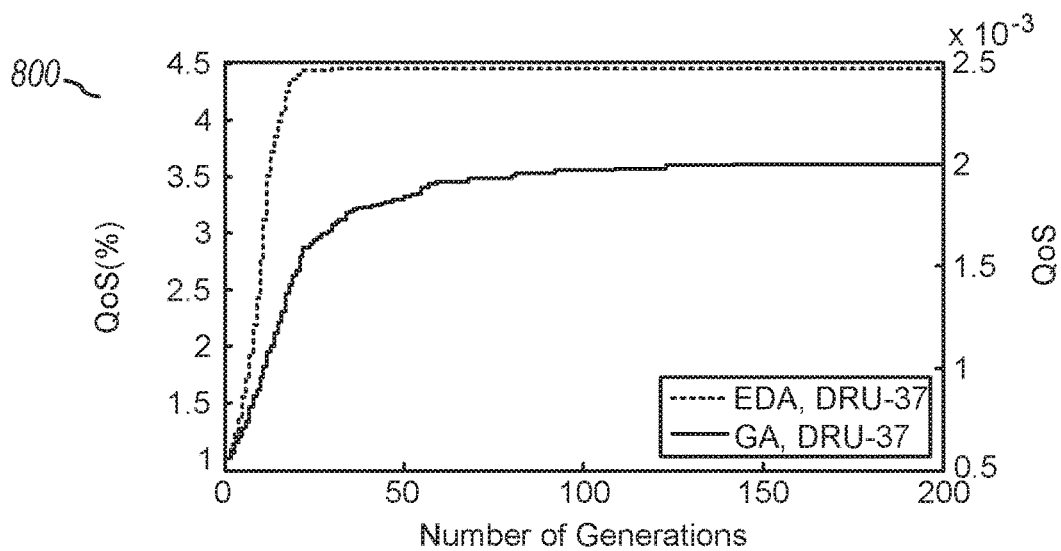
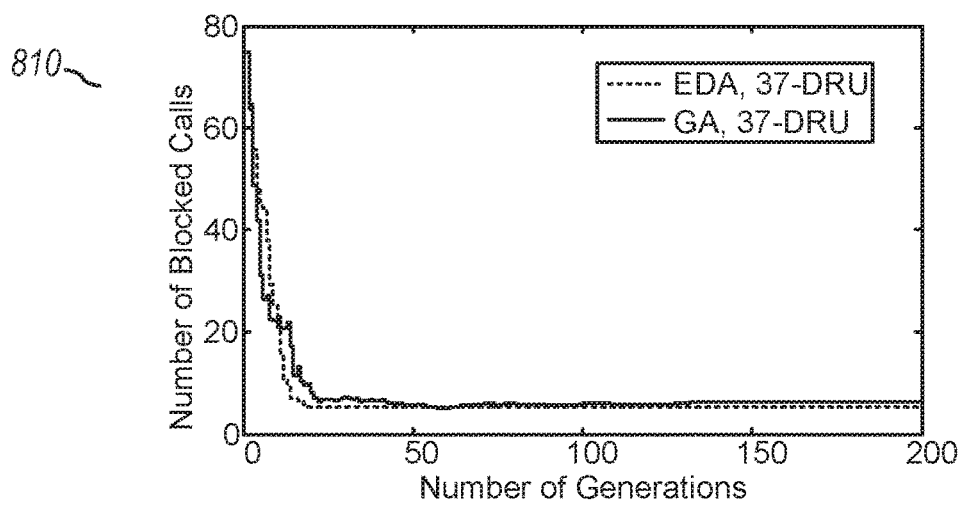
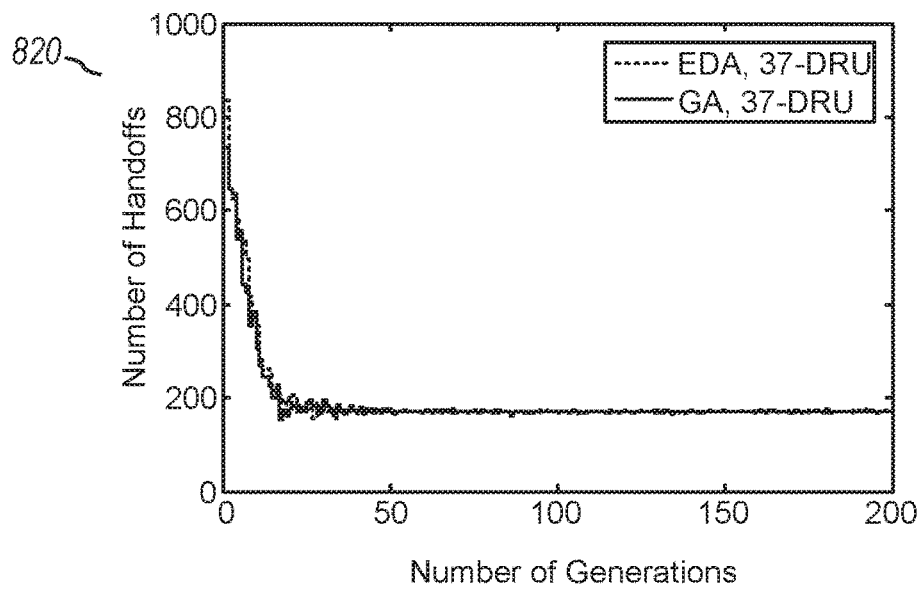
FIG. 8

EVOLUTIONARY ALGORITHMS FOR GEOGRAPHIC LOAD BALANCING USING A DISTRIBUTED ANTENNA SYSTEM

CROSS-REFERENCES TO RELATED APPLICATIONS

This application is a continuation of U.S. patent application Ser. No. 15/782,309, filed Oct. 12, 2017, which is a continuation of U.S. patent application Ser. No. 14/837,850, filed Aug. 27, 2015, now U.S. Pat. No. 9,854,494, which is a divisional of U.S. patent application Ser. No. 13/770,113, filed on Feb. 19, 2013, now U.S. Pat. No. 9,148,839, which claims priority to U.S. Provisional Patent Application No. 61/600,530, filed on Feb. 17, 2012, each of which are incorporated by reference in their entirety for all purposes.

BACKGROUND OF THE INVENTION

Distributed antenna systems (DAS) have been widely implemented in state-of-the art cellular communication systems to enhance wireless network capabilities. DAS has discernible advantages over conventional communication systems, due to its architectural design compared to traditional wireless network installations. Recent studies have identified other potential advantages for using DAS. However, most of the recent work on DAS does not focus on load balancing techniques for optimizing such performance. Therefore, there is a need in the art for improved methods and systems related to load balancing in DAS.

SUMMARY OF THE INVENTION

With the increase of cellular users, traffic hot spots and unbalanced traffic distributions are common in wireless networks. Embodiments of the present invention relate to a load-balancing system for mobile networks that optimizes cellular performance according to the traffic geographic distribution in order to provide a high quality of service (QoS). In some embodiments, a Virtualized Distributed Antenna System (VDAS) fed by a multi-sector Base Transceiver Station (BTS) has the ability to distribute the cellular capacity over a given geographic area. The VDAS can focus a portion of the BTS capacity around traffic "hot spots" and redistribute the remaining BTS capacity over the other cells. To enable load balancing among Distributed Antennas (DAs), embodiments of the invention may dynamically allocate DAs to the BTS sectors, depending on the time-varying traffic. VDAS sectorization is formulated as an integer linear constrained optimization problem in some embodiments, which minimizes the blocked calls and handoffs as two important key performance indicators (KPIs) in the network. In some embodiments, a VDAS sectorization technique considers connected and compact sectors to minimize the number of handoffs, while satisfying the capacity demand at each sector. Various embodiments include at least one of two evolutionary algorithms to solve the problem: Genetic Algorithm (GA) and Estimation Distribution Algorithm (EDA). Results are presented that evaluate the system performance for different traffic scenarios. Results demonstrate that the two algorithms attain excellent KPIs for small-scale networks.

Embodiments of the present invention include methods and apparatuses for optimizing traffic in VDAS wireless communications systems. Sectorization of DRUs is examined to balance the traffic in the VDAS LTE system. Proper sectorization is considered to effectively use the resources (licenses) in each sector that satisfies the soft and hard capacity. Connected and compact sectors are proposed to reduce handoffs and interferences. The DRU sectorization is formulated as an integer linear programming problem which minimizes blocked and handoff calls in some embodiments.

Embodiments including EDA and GA algorithms are disclosed to solve the sectorization problem and the solutions are compared with each other and optimal or lower bound solutions. Using three test problems, the EDA algorithm produced decidedly better and faster results than the GA algorithm and achieved optimality on the problems whose size allowed enumeration. Outstanding performance is illustrated by the EDA and GA algorithms, for small networks (19_DRU). For large networks, EDA demonstrates excellent quality in a reasonable time.

According to an embodiment of the present invention, a method for balancing non-uniformly distributed network traffic in a wireless communications system having a plurality of digital remote units (DRUs) is provided. The method includes partitioning the plurality of DRUs into a plurality of DRU sectors dynamically repartitioning the plurality of DRU sectors depending on traffic conditions in at least one of the DRU sectors, such that the repartitioning satisfies at least one of a soft capacity constraint or a hard capacity constraint. The dynamic repartitioning is based on at least one optimization algorithm. As an example, the at least one optimization algorithm can include at least one evolutionary algorithm such as either a Genetic Algorithm (GA) or an Estimation Distribution Algorithm (EDA).

In some embodiments, the at least one optimization algorithm includes at least one linear programming model including at least one of the following constraints: minimizing blocked calls, minimizing call handoffs, or maximizing a compactness index of each of the DRU sectors. Each of the DRU sectors can include connected DRUs and each of the DRU sectors can be substantially compact. As an example, the soft capacity constraint can include a maximum number of users in order to maintain an acceptable signal to noise ratio (SNR). As another example, the hard capacity constraint can include a total number of licenses/sources assigned to a virtual base station (VBS).

According to another embodiment of the present invention, a method for balancing non-uniformly distributed network traffic in a wireless communications system having a plurality of digital remote units (DRUs) is provided. The method includes a) providing a digital access unit (DAU) associated with a plurality of sectors of a base station and b) providing a plurality of DRUs associated with the DAU. The method also includes c) partitioning the plurality of DRUs into a plurality of DRU sectors and d) measuring a number of blocked calls associated with the plurality of DRU sectors. The method further includes e) determining that the number of blocked calls is greater than a predetermined threshold and f) iterating using at least elements (c) through (e).

According to a specific embodiment of the present invention, a method for balancing non-uniformly distributed network traffic in a Distributed Antenna System (DAS) is provided. The method includes a) providing a digital access unit (DAU) associated with a plurality of sectors of a base station and b) providing a plurality of Digital Remote Units (DRUs) associated with the DAU. The method also includes c) partitioning the plurality of DRUs into a plurality of DRU sectors and d) measuring at least one metric for traffic conditions associated with the plurality of DRU sectors. The method further includes e) comparing the at least one metric to a predetermined threshold, f) determining that iteration of partitioning is warranted, and g) iterating on at least elements (c) through (e).

According to another specific embodiment of the present invention, a Distributed Antenna System (DAS) is provided. The DAS includes one or more Digital Access Units (DAUs) and a plurality of Digital Remote Units (DRUs) coupled to the one or more DAUs. The system also includes a data processor coupled to the plurality of DRUs and comprising a non-transitory computer-readable storage medium comprising a plurality of computer-readable instructions tangibly embodied on the computer-readable storage medium, which, when executed by the data processor, provide for balancing of network traffic. The plurality of instructions include a) instructions that cause the data processor to partition the plurality of DRUs into a plurality of DRU sectors and b) instructions that cause the data processor to measure at least one system metric for traffic conditions associated with the plurality of DRU sectors. The plurality of instructions also include c) instructions that cause the data processor to compare the at least one system metric to a predetermined threshold and d) instructions that cause the data processor to determine that the at least one system metric is greater than the predetermined threshold. The plurality of instructions further include e) iterating at least elements (a) through (d). In some embodiments, depending on the particular system metric, the instructions can be modified to determine that the at least one system metric is less than the predetermined threshold. In this case, iteration is performed until the system metric is greater than or equal to the predetermined threshold. One of ordinary skill in the art would recognize many variations, modifications, and alternatives.

In some embodiments, the number of iterations may depend on traffic conditions in at least one of the DRU sectors, such that the repartitioning satisfies at least one of a soft capacity constraint or a hard capacity constraint. In some embodiments, the soft capacity constraint may include mitigating handoffs, and the hard capacity constraint may include a maximum number of processed calls at any one point in time. In some embodiments, the dynamic repartitioning is based on at least one optimization algorithm.

BRIEF DESCRIPTION OF THE DRAWINGS

An understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

FIGS. 2A and 2B illustrate an example methodology according to some embodiments.

FIG. 3 shows example sectorization problems and solutions according to some embodiments.

FIGS. 4A and 4B are example sectorization scenarios associated with some embodiments.

FIGS. 7, 8, and 9 illustrate quantitative improvements according to implementations of some embodiments.

DETAILED DESCRIPTION OF SPECIFIC EMBODIMENTS

Figure 1:
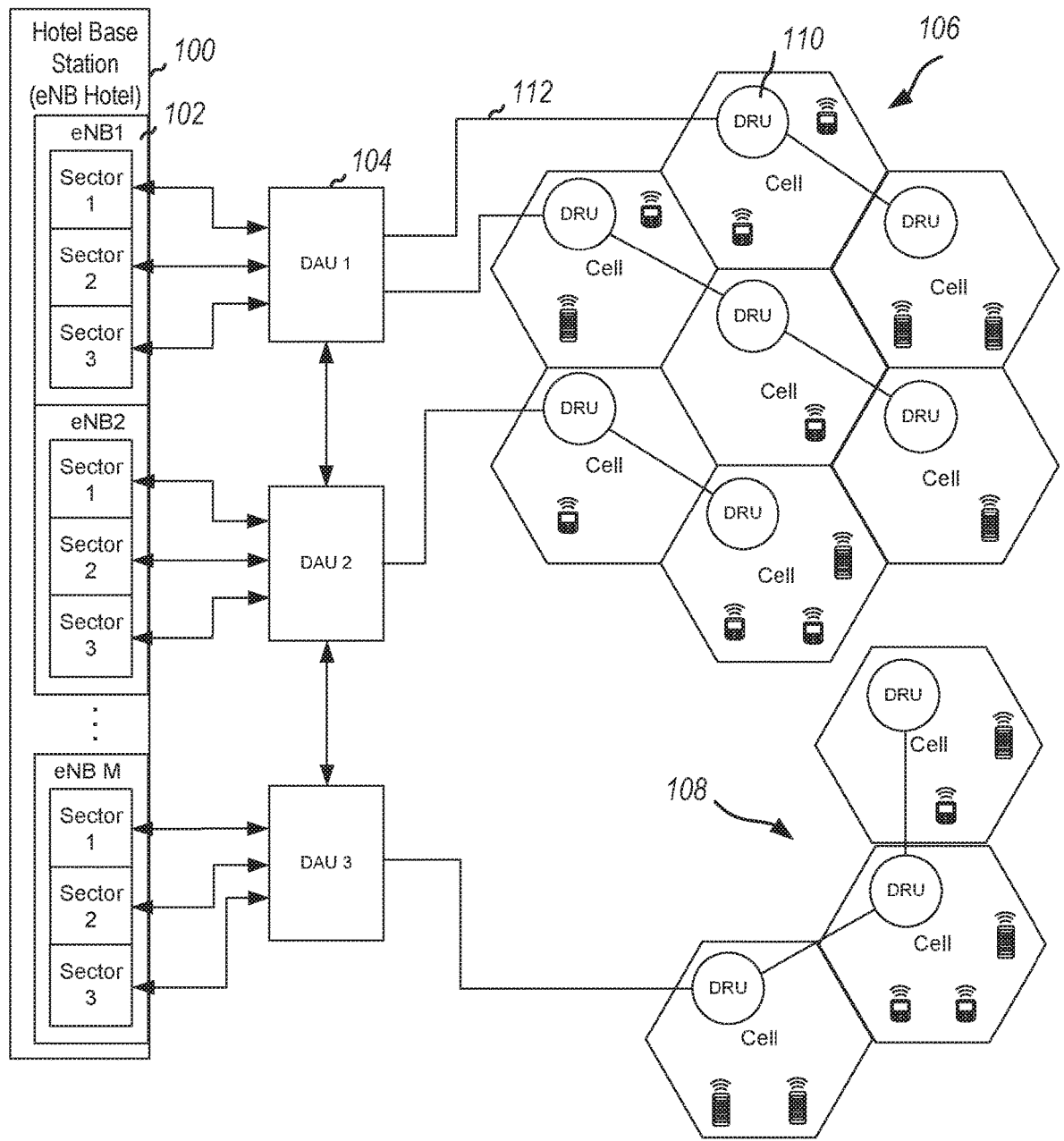
FIG. 1 is a schematic illustration of an example Distributed Antenna System (DAS) according to some embodiments.

3GPP LTE is a promising candidate for next generation wireless networks. In the last 15 years there has been substantial growth in cellular mobile communication systems. It is imperative to provide a high quality of service (QoS) at a minimum cost. With the substantial increase in cellular users, traffic hot spots and unbalanced call distributions are common in wireless networks. This decreases the quality of service and increases call blocking and dropping. Inter-cell optimization in GSM and UMTS networks is usually delivered at the stage of network planning, and often done manually. As traffic environments change, the network performance will not be optimum. It is therefore necessary to perform inter-cell optimization of the network dynamically according to the traffic environment, especially when cell traffic loads are not uniformly distributed. This is one of the important optimization issues in self-organizing networks (SON) for 3GPP LTE. When the traffic loads among cells are not balanced, the blocking probability of heavily loaded cells may be higher, while their neighboring cells may have resources not fully utilized. In this case load balancing can be conducted to alleviate and even avoid this problem. Additionally, other next-generation networks besides 3GPP LTE may experience similar problems. In some embodiments, the solutions presented herein may apply to those architectures as well.

According to some embodiments, one approach to solve this problem is to take advantage of aspects of a Distributed Antenna System (DAS). A DAS breaks the traditional radio base station architecture into two pieces: a central processing facility and a set of distributed antennas (DAs) connected to the central facility by a high-bandwidth network. The DAS network transports radio signals, in either analog or digital form, to/from the central facility where all the base stations processing is performed. By replacing a single high-power antenna with several low-power antennas distributed to give the same coverage as the single antenna, a DAS is able to provide more-reliable wireless service within a geographic area or structure while reducing power consumption. In a Virtualized DAS, the traffic load from multiple sectorized eNodeBs, at a hotel station, is distributed to multiple Digital Remote Units (DRU). This synergistic configuration also allows multiple operators to use multiple technologies over the same physical facilities, thereby providing a cost-effective means of furnishing subscribers with high quality, highly reliable communication services. With respect to a Virtualized DAS configuration, multiple DRUs can be dynamically assigned to the different eNodeB sectors depending on the time-varying traffic, in order to resolve unbalanced traffic scenarios.

One of the primary design challenges for a Virtualized DAS system is location area management. The location area management problem can be generally stated as: For a given network of nDRUs, the objective is to partition the network into m coverage areas, without exceeding the number of users which can be supported by the eNodeBs. To provide the best Quality of Service (QoS) for a given number of eNodeBs and resources, the call traffic must be dynamically balanced when we consider call handoffs and call blockage rates. This is a location management optimization problem that can be accomplished through delivering the sectorized eNodeB traffic to the independent DRUs.

Once traffic resources are aggregated into eNodeB hotels, the discrete resources of a single eNodeB are still allocated to a specific set of antennas associated with that eNodeB and providing coverage to a specific geographic area. The traffic resources are fixed, i.e., only the resources associated with a specific eNodeB can be allocated to the antennas associated with that eNodeB. However, because the eNodeBs are collocated in an eNodeB hotel, the system can use the aggregated traffic resources of the discrete eNodeBs as a single, pooled traffic resource that can be allocated according to various algorithms. Assumptions are typically predicated on worst-case traffic assets in all areas, network design is wasteful 99 percent of the time, inevitably resulting in over- or under-provisioning of fixed resources. Traffic resources either go unused (idle channels), or are under-provisioned and are insufficient to handle the offered traffic. Both circumstances give rise to the same outcome: lost revenue and lost opportunity. When a site's traffic resources are idle and unused, the traffic asset fails to provide an optimal return on investment. But a site that lacks sufficient capacity to support the offered traffic at any point during the day garners dropped calls, lost revenue opportunity, and dissatisfied customers. The traffic information derived from an extensive sensor network will be used to dynamically allocate the traffic resources to the required geographical areas only for the time period the service is needed. Once the service is supplied and the traffic sensor network determines that the traffic resources are no longer required, they are returned to the resource pool for reallocation. The entire network automatically reconfigures itself based on the perceived (sensed) need or in the event of disruption due to natural or manmade events.

Load balancing can be classified into two general categories: block probability-triggered load balancing and utility based load balancing. However, very little research has dealt with the unbalance load network scenario in LTE-like packet switched networks.

It may be known in the art various schemes related to mobile cellular networks and increasing system capacity. Balancing the traffic load and use of DAS are two of the most important ones which have rarely been considered in the art. Traffic load balancing in mobile cellular network may be well known since the first generation of mobile communication systems. Many methods have been proposed to address this problem, such as cell splitting, channel borrowing, channel sharing, dynamical channel allocation, etc. The applications of DAS in cellular networks may also be known. However, most work related to traffic load balancing only focuses on different radio resource allocation schemes, and most work on DAS only considers the radio propagation channels within a multi-cell to improve the system capacity.

Geographic load balancing using VDAS, as described in some embodiments of the present invention, is recognized as a new approach for traffic load balancing which provides dynamic load redistribution in real time according to the current geographic traffic conditions. It can be used to improve the performance for any distributed systems containing non-uniformly distributed traffic, especially for resolving traffic hot spots. Knowledge in dynamic sectorization, use of tilted antennas, and dynamic cell-size control (cell breathing) illustrate that the system performance can be improved by balancing non-uniformly distributed traffic.

Some embodiments of the present invention deliver the eNodeB traffic to independent DRUs with the objective to dynamically balance the traffic. Sectorization also reduces handoffs between cells allocated to the same sector, which is possible with the simulcast capability inherent in a DAS network. This disclosed management of the sectorized DRUs in some embodiments is distinct from the existing balancing methods. In previous dynamic balancing research, fixed basic resources are allocated to each cell and some reserved or borrowed resources are assigned to cells with higher traffic. However, in disclosed embodiments, units called hard capacities control resources and are assigned to eNodeBs by grouping DRUs depending on the time-varying traffic at each cell. Thus the dynamic sectorization that satisfies hard capacities dramatically reduces call blocking probability and call handoffs.

The remainder of this disclosure, all of which disclose certain aspects of the present invention, is organized as follows. Virtualized Distributed Antenna Systems and dynamic sectorization of DRUs. A formulation for the DRU load-balancing problem. Two evolutionary algorithms to solve the problem: Genetic Algorithm (GA) and Estimation Distribution Algorithm (EDA). The performance of two algorithms is compared with the optimal or lower bound solution.

Distributed Antenna System

Distributed antenna systems (DAS) have been widely implemented in state-of-the art cellular communication systems to cover dead spots. In DAS, antenna modules are geographically distributed to reduce access distance instead of centralizing at a location. Each distributed antenna module is connected to a home base station (eNodeB hotel or central unit) via dedicated wires, fiber optics, or an exclusive RF link.

From an architectural point-of-view, DAS has discernible advantages over conventional communication systems. DAS can reduce the system installation costs and simplify maintenance, because DAS can reduce the required number of base stations within a target service area. An alternative strategy is to try to reduce the overall transmit power using distributed antennas, which has the additional merit of providing better coverage and increased cellphone battery life. Although distributed antennas systems (DAS) were originally introduced to simply cover the dead spots in indoor wireless communications, recent studies have identified other potential advantages such as power and system capacity, and expanded its applications. Furthermore, blocking probability can be improved owing to the principle of trunking efficiency because resources for signal processing such as licenses/channel cards are centralized and shared at the home base station. In addition to these architectural advantages, DAS also has been shown to possess advantages in terms of power, signal-to interference-plus-noise ratio (SINR), and capacity owing to macro-diversity and the reduced access distance. Based on these advantages, many cellular service providers or system manufacturers are replacing legacy cellular systems with distributed antenna systems. However, most of the recent work on DAS has been focused on investigating those advantages and analyzing its performance. On the other hand, there are few disclosure on load balancing in time-varying networks using DAS.

System Structure

FIG. 1 discloses certain embodiments of the present invention. In a Virtualized DAS as shown in FIG. 1, Digital Remote Antennas (DRUs), such as DRU 110, are connected to an eNodeB hotel 100 via optical fiber, such as optical fiber cable 112, and Digital Access Units (DAU), such as DAU 104 (DAU 1). Each DRU may provide service to a cell, such that whoever is within range of the cell will be serviced by the particular DRU in the cell. The DRUs may be strategically installed so that the sum total of the DRUs may provide service to a wide area, such as the 7-cell area 106 as shown. In other cases, fewer DRUs may be installed, and may provide service to a smaller area, such as 3-cell area 108. The DAUs are interconnected and connected to multiple sectors, such as Sectors 1, 2, and 3 in eNodeB1 102. This capability enables the virtualization of the eNodeB resources at the independent DRUs. The eNodeB hotel 100 may be linked to a public switched telephone network or a mobile switching center. DRUs are sectorized such that each DRU allocated to a given eNodeB sector is simulcast. For the simulcasting operation, the access network between the eNodeB hotel and DRUs should have a multi drop bus topology. The DAUs dynamically assign the radio resources of the various sectors to the independent DRUs according to the traffic demand.

An eNodeB limitation for the number of active users is defined as hard capacity. Base Station vendors charge the operators based on the number of licenses (resources) allocated. In general, a three sector BTS, such as eNodeB 102, shares the licenses for traffic demand amongst the sectors. As an example, 600 licenses could be assigned to the three sector BTS. The set of 600 licenses is called the virtual base station (VBS). An eNodeB hotel can contain several VBSs.

Dynamic DRU Sector Allocation

According to some embodiments, in the Virtualized DAS discussed in relation to FIG. 1, it is beneficial to sectorize the DRUs to cope with dynamically changing traffic and to balance the traffic for each sector. At the DRU coverage area the traffic is increased or decreased depending on the period of time. Thus embodiments provide methods and systems to dynamically sectorize the DRUs such that the DRUs in a sector satisfy the soft capacity (e.g., the maximum number of users in order to maintain an acceptable SNR) and the sectors in a VBS meet the hard capacity (e.g., the total number of licenses/sources assigned to a VBS). Some embodiments focus on proper sectorization that satisfies the soft and hard capacities for balanced traffic. Without proper sectorization there may be cases of unbalanced traffic where the number of blocked calls are increased in a specific sector, even if the other sectors have very little traffic. FIG. 2A shows an example of sectorization where there are ten DRUs, three sectors and one VBS. The sectors as shown may be distinguished by the different orientation of lines within the DRUs. For example, the DRUs with horizontal lines constitute a first sector 202, the DRUs with criss-crossed lines constitute a second sector 204, and the DRUs with vertical lines constitute a third sector 206. The numbers within each hexagonal DRU may represent a present number of calls at a given time. Thus, for example, sector 202 currently services 80+70+50=200 calls in FIG. 2A. In this example, by assuming 600 licenses of hard capacity in the VBS and 200 channels of soft capacity per sector, improper sectorization produces 35 blocked calls, while the other two sectors have idle channels. This can be seen by observing that sector 206 has 50+45+80+60=235 calls at one time, while sector 204 has 40+35+75=150 calls. Assuming each call has its own separate channel, and each sector has a soft capacity of 200 channels, then sector 206 has 35 more calls than it can presently handle, resulting in 35 dropped or blocked calls. Such a situation may be characterized as an improper sectorization, due to at least one sector being heavily loaded with calls while other sectors still have capacity to handle more calls.

However, no calls are blocked and the traffic is well balanced in the proper sectorization. Referring to FIG. 2B, if the DRUs are balanced across the sectors better, then no blocked calls may occur. In this case, the DRU from sector 206 with 50 calls may be reallocated to sector 204 which had only 150 calls. Thus, a reallocation according to some embodiments results in balanced sectors 204' (40+35+75+50=200) and 206' (45+80+60=185) serving no more than their channel soft capacity, resulting in no blocked or dropped calls. Now, note that all DRUs allocated to a given sector broadcast the radio signals in a simulcast. In some embodiments, the number of blocked calls may be a metric that is desired to be minimized or otherwise optimized. For example, in some embodiments, if the number of blocked calls is currently above a predetermined threshold, then steps may be taken to reallocate DRUs to other sectors and to generally rebalance the load between sectors through a series of iterations until the number of blocked calls falls below the threshold.

In general, the present disclosures illustrate several problems that may result in inefficient and suboptimal sectorizations. For example, if the DRUs servicing these hexagonal areas are disconnected as in FIG. 3(a), there may be significant interference from other adjacent simulcasting groups. Notice how DRUs 302, with horizontal lines, is in the same sector as DRU 304, also with horizontal lines, but they are clearly disconnected. The disconnected sectorization also generates unnecessary handoffs between sectors. For example, if a user is on a call and passes from DRUs 302 over to DRU 304, the user will have to pass through some of the vertical-lined DRUs that are associated with a different sector. Each time the user crosses into a different sector, a handoff must take place, resulting in unnecessary handoffs and wasted resources. Therefore, it is better when cells allocated to a given sector are connected. To minimize the handoffs and interference among sectors we consider the compactness of DRU sectorization. FIG. 3(b) shows examples of connected but incompact sectorization of DRUs. For example, sector 206, 208, and 310, as distinguished by the different lined orientations, are each connected to DRUs within their respective sectors. However, the DRUs are grouped generally in a line formation. This may result in a higher tendency to have to perform handoffs, because there is a larger perimeter around the sectors than if the DRUs were grouped in a more compact manner. An isolated DRU surrounded by DRUs allocated to other sectors may experience higher interference than the DRUs in compact sectorization. Compact sectorization also reduces the number of handoffs by decreasing the length of the border between two different sectors.

In contrast, FIG. 3(c) shows a connected and compact configuration. The sectors 312, 314, and 316 all have their respective DRUs connected, and the configuration of the DRUs are more compact than say, FIG. 3(b) because there is a smaller perimeter around the sectors, resulting in smaller likelihood of users moving across the borders of the sectors and needing to perform handoffs. In general, it may be a goal according to some embodiments to generate sector configurations that are well balanced, in the sense that the number of blocked calls is minimized (i.e. proper sectorization), the number of handoffs may be minimized, and/or the configurations of the cells are connected and compact (which relates at least to minimizing the number of handoffs). Additionally, embodiments may be viewed as solving or mitigating a "soft-capacity" problem and/or a "hard-capacity" problem related to DRU sectorization. For example, a soft capacity constraint of the sectors may be the number of handoffs occurring between the sectors. A hard capacity constraint may be the number of channels each sector is allocated, thereby determining a maximum number of calls within the sector at any point in time.

To measure the compactness of sectorization in the hexagonal DRU environment, introduced is the compactness index (CI) which is defined as the ratio of the number of handoff cell sides to the total number of cell sides in a VBS. For example the CI of the sectorization of FIG. 3(b) is 10/18 and FIG. 3(c) is 7/18.

As will be discussed more below, embodiments of the present invention may perform dynamic repartitioning of DRUs into different sectors based on at least one optimization algorithm in order to reduce, minimize, and/or optimize these and other similar types of problems. The algorithm may involve measurement of various key performance indicators (KPI) including signal strength, which provides an indication of the number of users operating through a given DRU.

Formulation of DRU Sectorization

The network's performance (expressed by the number of KPIs from different parts of the network) determines the QoS values. Different operators may have different defined business goals and different services of interest. Based on these considerations, efficient and cost effective network performance management varies from operator to operator. Therefore, QoS metrics could be defined and mapped to a set of KPIs. When a set of KPIs is used, then the mapping needs to be represented by a weighted normalized function.

The following describes a formulation of the sectorization problem with mixed integer programming to balance traffic among sectors and to minimize handoffs with connected and compact sectors. These formulations are included in parts of embodiments of the present invention. Given the sectorization of DRUs at time period t, a problem is to obtain new sectorization at time period t+1 that adaptively balances the change in traffic demands.

In order to formulate the problem, consider a service coverage area with N DRUs. Each DRU is assumed to have traffic demand $T_i$ i=1, . . . , N. Note that, $UE_A$ belongs to $DRU_B$ if the received uplink power from $UE_A$ at $DRU_B$ is greater than the other DRUs. Let $p_{ij}$ be the transition probability of mobiles from $DRU_i$ to $DRU_j$. Then, the handoff calls from $DRU_i$ to $DRU_j$ become $h_{ij}=p_{ij}T_i$. The distance between $DRU_i$ and $DRU_j$ is inversely proportional to $p_{ij}$. Assume that an eNodeB hotel has M VBSs. Let $SOS_m$ and $SOD_k$ be the set of sectors in $VBS_m$ and the set of DRUs allocated to $Sector_k$, respectively, such that $|SOS_m|=3$ (if each eNodeB/VBS has three sectors), m=1, . . . , M and k=1, . . . , K. Now consider the following three cost factors (KPIs) in the sectorization problem:

(1) $KPI_{BC}$ (Inverse of the Number of Blocked Calls):

The penalty of the blocked calls caused by hard capacity and soft capacity. Let $HC_m$ and $SC_k$ be the hard capacity of $VBS_m$ and soft capacity of $Sector_k$ respectively such that $$HC_m = \sum_{k \in SOS_m} SC_k.$$

The binary variable $x_{ik}=1$, when $DRU_i$ belongs to $Sector_k$.

$$y_{im} = \sum_{k \in SOS_m} x_{ik},$$

then $y_{im}=1$ when $DRU_i$ belongs to $VBS_m$.

$$sc_k = \begin{cases} 0 & \text{if } \sum_i T_i x_{ik} < SC_k \\ \sum_i T_i x_{ik} - SC_k & \text{otherwise} \end{cases} \quad (1)$$

$$hc_m = \sum_i T_i y_{im} - HC_m = \sum_i T_i \sum_{k \in SOS_m} x_{ik} - \sum_{k \in SOS_m} SC_k$$

$$= \sum_{k \in SOS_m} \sum_i T_i x_{ik} - SC_k$$

$$= \sum_{k \in SOS_m} sc_k$$

Since a penalty occurs only when the calls are blocked, we apply just $sc_k$ to the objective function, because the $hc_m$ is a function of $sc_k$ and there is no need to add it as another term to the objective function. $sc_k$ is a nonnegative real variable. So, $$KPI_{BC} = \left[\sum_{k \in SOS_m} sc_k\right]^{-1} \quad (2)$$

(2) $KPI_{HO}$ (Inverse of the Number of Handoffs):

Consider three different types of Handoffs:

(A) Inter-eNodeB Handoff:

When user equipment (UE) with an ongoing call moves from one VBS to another VBS, then the UE needs an inter-eNodeB handoff. Inter-eNodeB handoff is executed using the X2 interface (as long as the UE does not leave the LTE coverage area) or S1 interface (when the UE leaves the serving cell). The X2 handoff includes establishing a signaling connection using the X2 Application Part (X2AP) from the source to the target eNodeB. The target eNodeB updates the MME (Mobility Management Entity) with the new geographic position of the UE. To enable this procedure, the MME needs to communicate with S-GW (Serving Gateway) to negotiate the new endpoint. During the S1 handoff, the MME receives the relocation preparation request of the source eNodeB, it starts the handoff resource allocation procedure to request the necessary radio resource from the target eNodeB. After the target eNodeB sends the required radio interface parameters embedded in a handoff command message; the MME forwards this handoff command message transparently to the UE, which executes the handoff. The main procedure is triggered by the MME and executed by S-GW.

Let the binary variable $z_{ijm}=1$, when $DRU_i$ and $DRU_j$ belong to $VBS_m$. Then the inter-eNodeB handoff cost is computed by using the variable $$z_{ij} = 1 - \sum_m z_{ijm},$$

the cost becomes $$\sum_i \sum_j h_{ij} z_{ij}.$$

Note that inter-eNodeB handoff occurs when $DRU_i$ and $DRU_j$ belong to different VBS, i.e., $z_{ijm}=0$.

(B) Intra-eNodeBHandoff:

When a UE with an ongoing call moves from one sector to another in a VBS, then the mobile needs an intra-eNodeB handoff. This procedure doesn't need to involve MME or S-GW because it can be handled entirely within that VBS. Now by letting the binary variable $w_{ijk}=1$ when $DRU_i$ and $DRU_j$ belong to sector k, the intra-eNodeB handoff cost is computed by using two variables $w_{ij}-z_{ij}$ where $$w_{ij} = 1 - \sum_k w_{ijk},$$

the cost becomes $$\sum_i \sum_j h_{ij}(w_{ij} - z_{ij}).$$

An intra-eNodeB handoff occurs when $DRU_i$ and $DRU_j$ belong to different sectors of the same VBS.

(C) Forced Handoff:

When a DRU changes its sector, all ongoing calls in the cell have to change their pilot PN offsets for WCDMA. The cost of forced handoff is computed by employing the current sectorization $a_{ik}$, which is equal to zero when $DRU_i$ is in $Sector_k$. Since the cost occurs when $DRU_i$ currently in another sector moves into $Sector_k$, the cost becomes $$\sum_i \sum_j a_{ik} T_i x_{ik}.$$

The weighted combination of these three handoff cost would be:

$$KPI_{HO} = \tag{3}$$

$$\left[ c_1 \sum_i \sum_j h_{ij} z_{ij} + c_2 \sum_i \sum_j h_{ij}(w_{ij} - z_{ij}) + c_3 \sum_i \sum_k a_{ik} T_i x_{ik} \right]^{-1}$$

(3) $KPI_{CI}$ (Inverse of the Compactness Index):

The object here is to minimize the length of handoff border with the compactness index CI. In Equation (4) the numerator term represents the number of handoff DRU sides between two different sectors.

$$KPI_{CI} = [CI]^{-1} = \left[ \frac{\sum_i \sum_{i<j} w_{ij} B_{ij}}{\sum_i \sum_{i<j} B_{ij}} \right]^{-1} \tag{4}$$

Where $B_{ij}=1$, if $DRU_i$ and $DRU_j$ are adjacent.

Now consider the following constraints required in the formulation included in various embodiments of the invention:

1. each DRU has to belong to a sector, that is, $$\sum_k x_{ik} = 1 \text{ for all } i \tag{5}$$

2. The relationship between any two DRUs in a $Sector_k$ has to satisfy $w_{ijk}=1$ if and only if $x_{ik}=x_{jk}=1.$ Thus:

$w_{ijk} \leq x_{ik}, w_{ijk} \leq x_{jk}$ and $w_{ijk} \geq x_{ik}+x_{jk}-1$ for all $i, j$ and $k$ (6)

3. The relationship between two DRUs in a $VBS_m$. $z_{ijm}=1$ if and only if $y_{im}=y_{jm}=1$ which leads to:

$z_{ijm} \leq y_{im}, z_{ijm} \leq y_{jm}$ and $z_{ijm} \geq y_{im}+y_{jm}-1$ for all $i,j$ and $k$ (7)

4. Connected sectorization, if a sector has more than one DRU, then the DRUs of the sector have to be connected. For the formulation of connected sectors we employ the cut theorem on $SOD_k$. If $Sector_k$ is connected, then any cut that separates cells in $SOD_k$ has at least one common side of the hexagonal cells. Let $S1_k$ be a proper subset of $SOD_k$, that is, $S1_k \subset SOD_k$, $S1_k \neq \phi$, and $S1_k \neq SOD_k$. Also let $S2_k$ be the opposite set of $S1_k$, that is, $S2_k = SOD_k - S1_k$. Because two subsets are connected, there exists at least one common side of the DRUs separated by the subsets. In other words:

$$\sum_{i \in S1_k} \sum_{j \in S2_k} B_{ij} \geq 1 \tag{8}$$

Now, the QoS function is the weighted combination of three KPIs (cost factors) which have already been introduced, above. Obviously the objective function is to maximize the QoS function. There are penalties of blocked calls by hard and soft capacities and handoff calls. The DRU sectorization can be formulated as the following mixed integer linear programming:

Minimize $$QoS^{-1} = w_1 \cdot KPI_{BC}^{-1} + w_2 \cdot KPI_{HO}^{-1} + w_3 \cdot KPI_{CI}^{-1} \tag{9}$$

Subject to:

$$\sum_k x_{ik} = 1 \text{ for all } i$$

$w_{ijk} \leq x_{ik}, w_{ijk} \leq x_{jk}$ and $w_{ijk} \geq x_{ik} + x_{jk} - 1$ for all $i, j$ and $k$ -continued $$w_{ij} = 1 - \sum_k w_{ijk} \text{ for all } i, j$$

$$y_{im} = \sum_{k \in SOS_m} x_{ik} \text{ for all } m$$

$$z_{ijm} \leq y_{im}, z_{ijm} \leq y_{jm} \text{ and } z_{ijm} \geq y_{im} + y_{jm} - 1$$

for all $i$, $j$ and $m$ $$z_{ij} = 1 - \sum_k z_{ijk} \text{ for all } i, j$$

$$\sum_{i \in S1_k} \sum_{j \in S2_k} B_{ij} \geq 1$$

for all $S1_k \subset SOD_k$ where $S1_k \neq \phi$ and $S1_k \neq SOD_k$ and $$S2_k = SOD_k - S1_k$$

$$h_{ij} = p_{ij}T_i \text{ for all } i \text{ and } j$$

$$hc_m = \sum_i T_i y_{im} - HC_m \text{ for all } m$$

$$sc_k = \begin{cases} 0 & \text{if } \sum_i T_i x_{ik} < SC_k \\ \sum_i T_i x_{ik} - SC_k & \text{otherwise} \end{cases} \text{ for all } k$$

$x_{ik}, w_{ijk}, z_{ijm}, P_k \in \{0, 1\}$ for all $i, j, k$ and $m$

Note that many grouping problems which are special cases of the sectorization problem are well-known NP-hard problems. Since our problem is NP hard, the time it takes to execute the algorithm is exponentially increasing with the size of the problem. Such an algorithm is thus in most cases unusable for real-world size problem. As an encouraging result on NP-hard problems, we investigate evolutionary algorithms to solve the sectorization problem and compare the performance with the solutions obtained by the mixed integer programming.

Evolutionary Algorithm

Evolutionary algorithms have been used to solve difficult optimization problems. Some embodiments employ evolutionary algorithms to optimize the network traffic in the system. Candidate solutions to an optimization problem are represented as individuals in the population. Evolutionary Algorithms (EAs) are inspired by the theory of biological evolution. In EAs the cost function value of a candidate solution to the optimization problem indicates the fitness of the individual in the concept of natural selection. In the following, two types of Evolutionary algorithms are discussed in relation to solving the problem formulated above: Genetic Algorithm and Estimation Distribution Algorithm.

A. Genetic Algorithm (GA)

GAs are stochastic search methods that mimic genetic phenomena such as gene recombination, mutation and survival of the fittest. GAs have been applied to a large number of scientific and engineering problems, including many combinatorial optimization problems in networks. GAs operate on a set of candidate solutions, called a population. Each solution is typically represented by a string, called a chromosome. Each chromosome is assigned a fitness value that measures how well the chromosome solves the problem at hand, compared with other chromosomes in the population. From the current population, a new population is generated typically using three genetic operators: selection, crossover and mutation. Chromosomes for the new population are selected randomly (with replacement) in such a way that fitter chromosomes are selected with higher probability. For crossover, survived chromosomes are randomly paired, and then two chromosomes in each pair exchange a subset of their strings to create two offspring. Chromosomes are then subject to mutation, which refers to random flips of the string's element applied individually to each of the new chromosomes. The process of evaluation, selection, crossover and mutation forms one generation in the execution of a GA. The above process is iterated with the newly generated population successively replacing the current one. The GA terminates when a certain stopping criterion is reached, e.g., after a predefined number of generations. There are several aspects of this problem suggesting that a GA-based method may be a promising candidate and are thus used in some embodiments: GA has proven to work well if the space to be searched is large, but known not to be perfectly smooth, or if the space is not well understood, and if finding a global optimum is not critical. In general, they use a penalty function to encode problem constraints and allow a search for illegal solutions, e.g., a solution that violates the connectedness or compactness of DRUs in this sectorization problem. Allowing a search for illegal solutions may prevent falling down into a local minimum and generate a better solution. During each generation of the GAs individuals in the current population are rated for their fitness as domain solutions. The fitness value is based on the objective function value of Equation (9).

In general, conventional GAs can be characterized by parameters and notations $$(I_s, F, \Delta_l, \eta_l, \beta_l, P_s, Pc, Pm, I_{Ter}) \quad (10)$$

where
1) $I_s$ is the space of all potential solutions (entire search space of chromosomes).
2) F denotes a fitness function.
3) $\Delta_l$ is the set of chromosomes (population) at the $1_{th}$ generation.
4) $\eta_l$ is the set of best candidate solutions selected from set $\Delta_l$ at the $1_{th}$ generation.
5) We denote $\beta_l \equiv \Delta_l - \eta_l \equiv \Delta_l \cap \eta_l^C$. where $\eta_l^C$ is the complement of $\eta_l$.
6) $p_s$ is the selection probability. The GA algorithm selects $p_s|\Delta_l|$ individuals from set $\Delta_l$ to make up set $\eta_l$.
7) Pc is the crossover probability. In the uniform crossover process two chromosomes are randomly chosen with a probability Pc and genes are exchanged with a rate CR.
8) Pm is the mutation probability. For the mutation a gene is randomly chosen with a probability Pm and the value of the gene is changed.
9) $I_{Ter}$ are the maximum number of generation.

In conventional GAs, each chromosome is designated by a string of different gene with length n (n-dimensional vector). A typical GA is described in the following steps:

Step 0: Generate initial population $\Delta_0$. The initial population ($|\Delta_0|$chromosomes) is typically obtained by sampling according the uniform (equally likely) distribution.

Step 1: Evaluate the chromosomes in the current population $\Delta_{i-1}$ according to the fitness function F. Sort the candidate solutions (chromosomes in the current population) according to their fitness orders.

Step 2: If the best candidate solution satisfies the convergence criterion or the number of iterations exceeds its limit $I_{Ter}$, then terminate; else go to step 3.

Step 3: Select the best $p_s\Delta_{l-1}$ candidate solutions (chromosomes) from current population $\Delta_{l-1}$. This selection is accomplished according to the sorted candidate solutions.
Step 4: Perform uniform crossover and flipping mutation and then generate new $|\Delta_{l-1}|-|\eta_{l-1}|$ chromosomes on the basis of these performing. Replace the bad $|\beta_{l-1}|$ chromosomes with newly generated $|\Delta_{l-1}|-|\eta_{l-1}|$ chromosomes.
Step 5: Go to step 1 and repeat the steps B. Estimation Distribution Algorithm (EDA)

Unlike other evolutionary algorithms, in EDA a new population of individuals in each generation is generated without crossover and mutation operators. Instead, in EDA a new population is generated based on a probability distribution, which is estimated from the best selected individuals of previous generation. We introduce each main-vector as an individual for the EDA approach to embodiments of the present invention, and also the fitness function is objective function. In general, conventional EDAs can be characterized by parameters and notations $$(I_s, F, \Delta_l, \eta_l, \beta_l, p_s, \Gamma, I_{Ter}) \tag{11}$$

where
1) $I_s$ is the space of all potential solutions (entire search space of individuals).
2) F denotes a fitness function.
3) $\Delta_l$ is the set of individuals (population) at the $l_{th}$ generation.
4) $\eta_l$ is the set of best candidate solutions selected from set $\Delta_l$ at the $l_{th}$ generation.
5) We denote $\beta_l \equiv \Delta_l - \eta_l \equiv \Delta_l \cap \eta_l^C$, where $\eta_l^C$ is the complement of $\eta_l$.
6) $p_s$ is the selection probability. The EDA algorithm selects $p_s|\Delta_l|$ individuals from set $\Delta_l$ to make up set $\eta_l$.
7) We denote by $\Gamma$ the distribution estimated from $\eta_l$ (the set of selected candidate solutions) at each generation.
8) $I_{Ter}$ are the maximum number of generation In conventional EDAs, each individual is designated by a string. A typical EDA is described in the following steps:
Step 0: Generate initial population $\Delta_0$. The initial population ($|\Delta_0|$ individuals) is typically obtained by sampling according the uniform (equally likely) distribution:

$$p(\theta_1, \theta_2, \ldots, \theta_n) = \prod_{i=1}^{n} p_i(\theta_i), \tag{12}$$

$\forall\, i = 1, 2, \ldots, n$, and $$p_i(\theta_i = S_{11}) = p_i(\theta_i = S_{21}) = \ldots = p_i(\theta_i = S_{|SOS_M|M}) = \frac{1}{\sum_{n=1}^{M} |SOS_M|}$$

For generation l=1, 2, . . . , follow steps 1 through 6
Step 1: Evaluate the individuals in the current population $\Delta_{l-1}$ according to the fitness function F. Sort the candidate solutions (individuals in the current population) according to their fitness orders.
Step 2: If the best candidate solution satisfies the convergence criterion or the number of generation exceeds its limit $I_{Ter}$, then terminate; else go to step 3.
Step 3: Select the best $p_s\Delta_{l-1}$ candidate solutions (individuals) from current population $\Delta_{l-1}$. This selection is accomplished according to the sorted candidate solutions.
Step 4: Estimate the probability distribution $p(\theta_1, \theta_2, \cdots, \theta_n)$ on the basis of $|\eta_{l-1}|$ best candidate solutions. This estimation is denoted by $$\Gamma = P(\theta_1, \theta_2, \cdots, \theta_n | \eta_{l-1}) \tag{13}$$

Step 5: Generate new $|\Delta_{l-1}|-|\eta_{l-1}|$ individuals on the basis of this new estimated probability distribution $\Gamma$. Replace the bad $|\beta_{l-1}|$ individuals with newly generated $|\Delta_{l-1}|-|\eta_{l-1}|$ individuals.
Step 6: Go to step 1 and repeat the steps Embodiments of the present invention follow the steps of the above pseudo code in the EDA implementations. For estimation, a simple scheme of estimating the marginal distributions separately is used, and using product form $$= p(\theta_1, \theta_2, \ldots, \theta_n | \eta_{l-1}) = \prod_{i=1}^{n} p_i(\theta_i | \eta_{l-1}) \tag{14}$$

$$= \prod_{i=1}^{n} \left( \frac{\sum_{j=1}^{|\eta_{l-1}|} \delta(x_i^j = \theta_i | \eta_{l-1})}{|\eta_{l-1}|} \right)$$

Where $\delta$ is an indicator function and it can be expressed as $$\delta(x_i^j = \theta | \eta_{l-1}) = \begin{cases} 1 & \text{if } x_i^j = \theta \\ 0 & \text{otherwise} \end{cases} \tag{15}$$

The efficiency of the three algorithms for the DRU sectorization problem has been analyzed in accordance with various embodiments of the present invention. Traffic is assumed uniformly distributed over the DRUs. The number of VBSs and sectors are assumed as in Table I. The possible number of sectorizations increases exponentially with the number of DRUs. The performance of proposed algorithms will be investigated by comparing with each other and optimal solutions of the formulation.

The cost coefficients employed for the objective function in Equation (9) are $w_1=w_3=10$, $w_2=1$, $c_1=2$, and $c_2=c_3=1$. Higher weights are given to $w_1$ and $w_5$, in order to minimize the blocked calls by hard and soft capacity and CI is the first priority in the sectorization. The weight by the inter-eNodeB handoff $w_1$ is twice that of the intra-eNodeB handoff $w_2$ because handoff between two sectors on the same eNodeB can be handled entirely within that eNodeB, while handoff between two eNodeBs involves not only those eNodeBs, but also the MME and S-GW as well; this latter case is much more expensive, since it involves more signaling, more processing, more coordination, and more time. However, since the forced handoff only occurs at the beginning of sectorization period, equal weights are given to $w_2$ and $w_3$. Presented are the optimal solutions for the 19, 37 and 61 DRUs problems using MATLAB simulations to validate the performance of certain embodiments.

Parameters for Algorithms

Before investigating the performance of the algorithms for the sectorization problem, declared are tunings of the algorithms parameters.

In GA Algorithm, each gene in a chromosome represents the sector and VBS to which the corresponding DRUs belong. We denote by a row vector $X=(x_1, x_2, \cdots, x_n)$, $x_i \in \{S_{jk} | j=1, \ldots, |SOS_k|, k=1, \ldots, M\}$, i=1 . . . n as a chromosome where $x_i=S_{jk}$ means $DRU_i$ belongs to $VBS_k$ and $Sector_j$. A GA maintains a population of chromosomes in each generation. We denote by $|\Delta_l|$ the number of chromosomes in population $\Delta_l$. Where superscript j in the row vector $X^j=(x_1^j, x_2^j, x_3^j, \ldots, x_n^j)$ indexes an individual in the population. In the uniform crossover process two chromosomes are randomly chosen with a probability $P_c$=0.9 and gene are exchanged with a rate 0.4. For the mutation a gene is randomly chosen with a probability $P_m$=0.1 and the value of the gene is changed, that is, the DRU changes its sector. The selection probability is $P_s$=0.5.

In EDA Algorithm, each individual is designated by a string, members of which are taken from the set S, i.e. $\{S_{jk}|j=1, \ldots, |SOS_k|, k=1, \ldots, M\}$ with length n (n-dimensional vector) where $S_{jk}$ means $DRU_i$ belongs to $VBS_k$ and $Sector_j$. Each member in an individual represents the sector and VBS to which the corresponding DRUs belong. We denote by a row vector $X=(x_1, x_2, \bullet \bullet \bullet, x_n)$, $x_i \in S$, i=1 ... n as an individual. An EDA maintains a population of individuals in each generation. We denote by $|\Delta_l|$ the number of individuals in population $\Delta_l$. Where superscript j in the row vector $X^j=(x_1^j, x_2^j, x_3^j, \ldots, x_n^j)$ indexes an individual in the population. The selection probability is $P_s$=0.5.

Generating the Initial Population

Generally in both algorithms, the initial population is chosen randomly from set S with uniform distribution. It should be noted that it is possible to get all infeasible solutions or very small number of feasible solutions when the size of the population in GA or EDA is much smaller than the size of the whole search space. To overcome this problem, it is necessary to have some percentage (e.g., x %) of the initial population to be exactly in the form of sectorizing, on which the algorithm will be applied. In our algorithms we consider x=30.

Performance of the Algorithms

Referring to FIGS. 4A, 4B, 5A, 5B, 6A, and 6B, we now consider three benchmarking problems illustrating various techniques and results according to some embodiments. In these cases, for the traffic distribution, we use an Erlang distribution with average traffic of 50 for all problems. We found the optimal solutions of the 19DRU problem using MATLAB to validate the performance of the heuristics. We terminate the algorithms after 35, 200 and 200 generations in 19_DRU (FIGS. 4A and 4B), 37_DRU (FIGS. 5A and 5B) and 61_DRU (FIGS. 6A and 6B) scenarios, respectively. We define the convergence rate to be the number of times an optimal (or best found for the 37 and 61 DRUs problems) solution is obtained over the overall number of generations performed. Each of the examples shown, e.g. FIGS. 4A, 4B, 5A, 5B, 6A, and 6B, represent just one example problem and solution with respect to a certain size and scale of a number of DRUs to be balanced. These are merely just examples, as it should be clearly seen that many of the characteristics in each example can vary, e.g., the number of calls within each DRU, the number of DRUs initially in a sector, the number of sectors within each VBS, the number of VBSs, the soft capacity of each sector, and the like, all of which are possible according to some embodiments. Table I shows a brief summary of the different scenarios presented in FIGS. 4A, 4B, 5A, 5B, 6A, and 6B:

TABLE I

Description of three benchmarking examples

|  | 19_DRUs | 37_DRUs | 61_DRUs |
| --- | --- | --- | --- |
| Number of DRUs | 19 | 37 | 61 |
| Number of VBSs/eNBs | 2 | 3 | 4 |
| Number of Sectors | 6 | 9 | 12 |

For the 19_DRU problem, for example, as shown in FIGS. 4A and 4B, the evaluation QoS values of the old and the new groupings at times t and t+1 are $1.1*10^{-3}$ ($KPI_{BC}^{-1}=90$, $KPI_{HO}^{-1}=0$, CI=22/42) and $3.488*10^{-3}$ ($KPI_{BC}^{-1}=0$, $KPI_{HO}^{-1}=155$, CI=23/42) as shown in FIG. 4A. The key 400 shows two VBSs with 3 sectors each in order to constitute the 19-cell DRU configuration as shown. We find an optimal solution with evaluation value of 286.904 using MATLAB with execution time=$8.64*10^5$ CPU seconds (around 9 days). The convergence rate of the EDA to this optimal solution is 0.93 (over 200 generations) with 0.082 CPU seconds while the convergence rate of GA is 0.89 (over 200 generations) with 0.0901 CPU seconds (cross-reference to FIG. 7). The resulting optimal solution is shown in FIG. 4B.

Figures 5A, 5B:
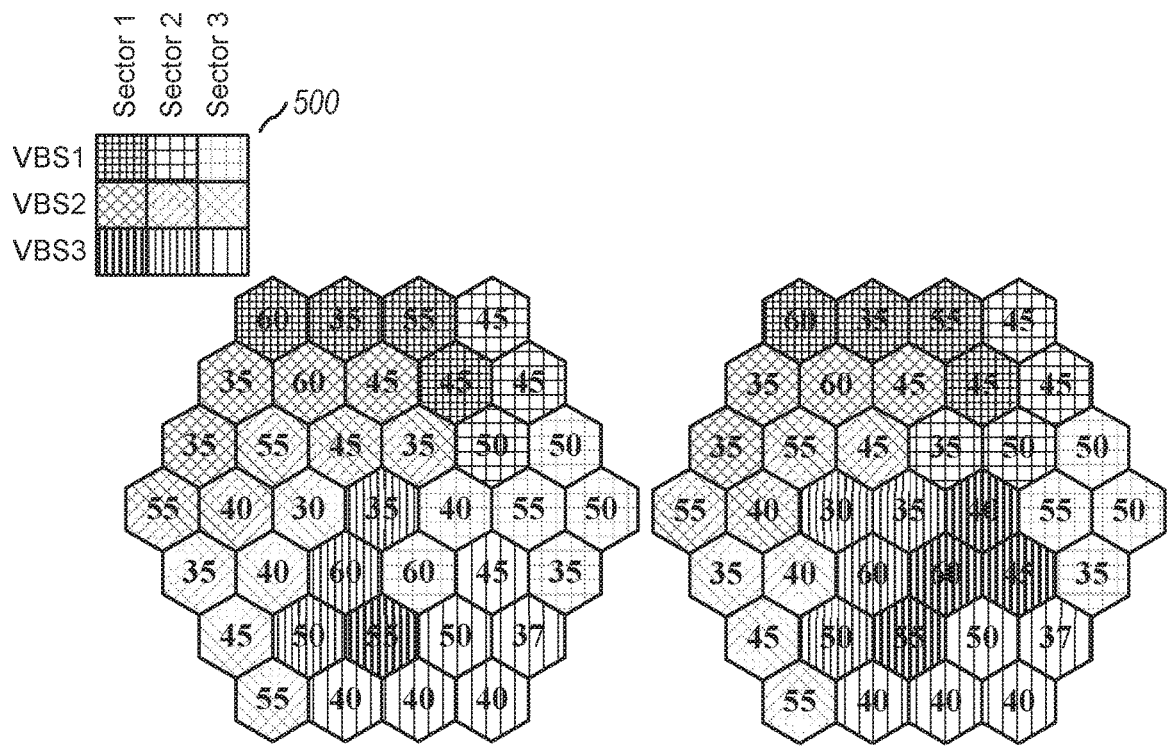
FIGS. 5A and 5B are other example sectorization scenarios associated with some embodiments.

For the 37_DRU problem, for example, as shown in FIGS. 5A and 5B, the evaluation QoS values of the old and the new groupings at times t and t+1 are $0.5*10^{-3}$ ($KPI_{BC}^{-1}=177$, $KPI_{HO}^{-1}=0$, CI=56/90) and $2.4*10^{-3}$ ($KPI_{BC}^{-1}=7$, $KPI_{HO}^{-1}=194$, CI=56/90) as shown in FIGS. 5A and 5B. The key 500 shows three VBSs with 3 sectors each in order to constitute the 37-cell DRU configuration as shown. This problem may be computational intensive, so we compare the performance of the EDA and the GA using convergence rate within limited CPU time. The convergence rate of the EDA to the best found solution is 0.87 with 0.1532 CPU seconds while the convergence rate of GA is 0.50 with 0.169 CPU seconds (cross-reference to FIG. 8). The resulting improved solution is shown in FIG. 5B.

Figures 6A, 6B:
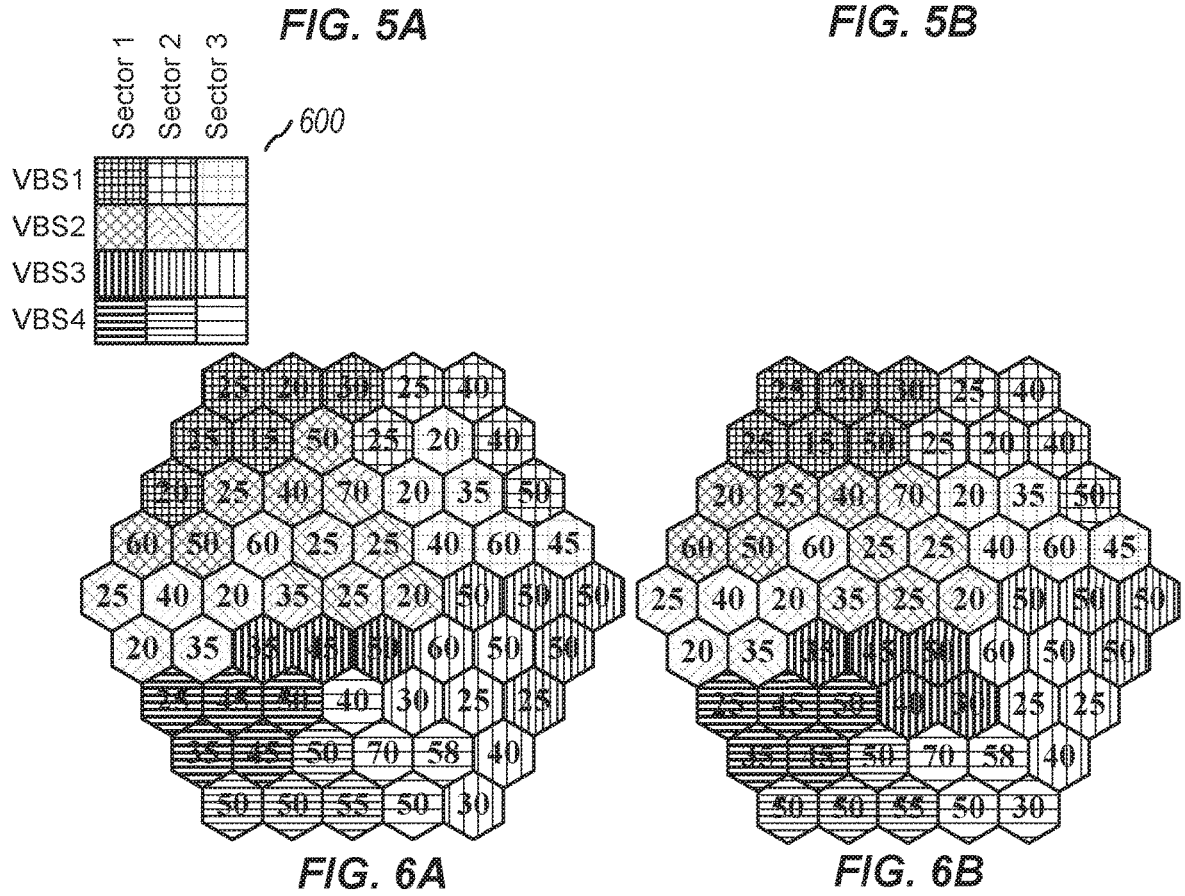
FIGS. 6A and 6B are yet other example sectorization scenarios associated with some embodiments.

For the large 61_DRU problem, for example, as shown in FIGS. 6A and 6B, the evaluation QoS values of the old and the new groupings at times t and t+1 are $0.77*10^{-3}$ ($KPI_{BC}^{-1}=128$, $KPI_{HO}^{-1}=0$, CI=89/156) and $2.8*10^{-3}$ ($KPI_{BC}^{-1}=13$, $KPI_{HO}^{-1}=105$, CI=77/156) as shown in FIGS. 6A and 6B. The key 600 shows four VBSs with 3 sectors each in order to constitute the 61-cell DRU configuration as shown. This problem may also be computational intensive, so we compare the performance of the EDA and the GA using convergence rate within limited CPU time. The convergence rate of the EDA to the best found solution is 0.88 with 0.2815 CPU seconds while the convergence rate of GA is 0.49 with 0.3012 CPU seconds (cross-reference to FIG. 9).

Figure 9:
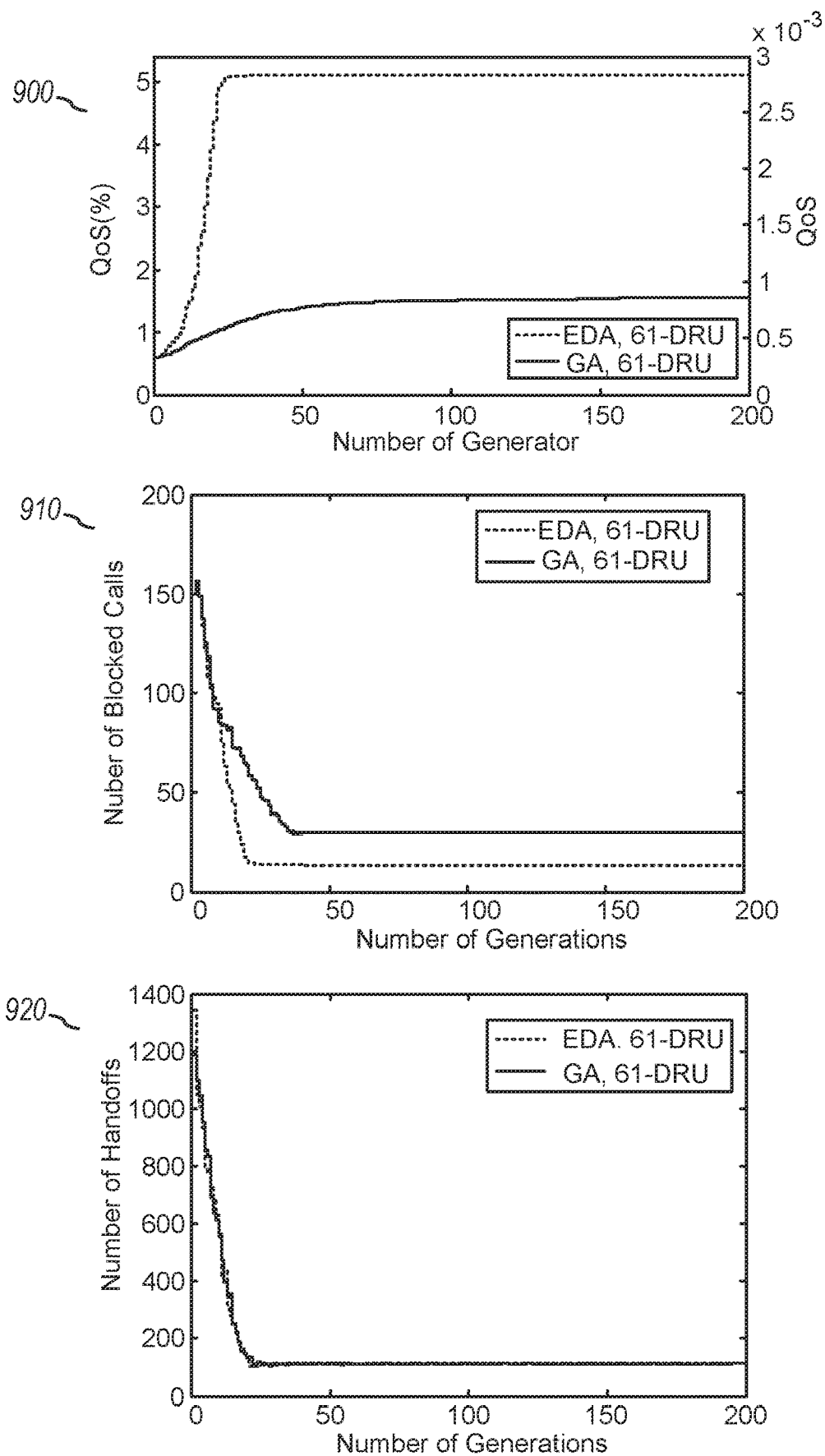

FIGS. 7, 8 and 9 show example performance results using EDA and GA algorithms according to some embodiments. The results may show that not only does EDA significantly outperform GA in its convergence rate to the best solution, but also even the non-optimal solutions are much closer to the best solution as compared to GA. However, in both cases, the DRUs are significantly more efficient and better balanced than if no techniques according to embodiments were performed at all.

Specifically, referring to FIG. 7, chart 700 shows the quality of service (QoS %) metric between the EDA and GA algorithms for the 19-DRU problem, for example as discussed in FIGS. 4A and 4B. In this case, both EDA and GA algorithms seem to reach the same level of QoS, but GA seems to reach it quicker through an earlier number of generations. Chart 710 shows a number of block calls metric between the EDA and GA algorithms for the 19-DRU problem. As shown, the number of blocked calls is virtually eliminated by implementing techniques of some embodiments. Chart 720 shows the number of handoffs occurring using both EDA and GA algorithms. Here, both algorithms generally result in an 80% reduction, or a five-fold improvement, in the number of handoffs compared to using no techniques according to embodiments of the present invention.

Referring to FIG. 8, chart 800 shows the quality of service (QoS %) metric between the EDA and GA algorithms for the 37-DRU problem, for example as discussed in FIGS. 5A and 5B. In this case, the EDA algorithm seem to reach a higher level of QoS, while it can be clearly seen that both methods drastically improve the QoS compared to if no techniques were performed. Chart 810 shows a number of block calls metric between the EDA and GA algorithms for the 37-DRU problem. As shown, the number of blocked calls is drastically reduced by implementing techniques of some embodiments. Chart 820 shows the number of handoffs occurring using both EDA and GA algorithms. Here, both algorithms generally result in an 75% reduction, or a four-fold improvement, in the number of handoffs compared to using no techniques according to embodiments of the present invention.

Referring to FIG. 9, chart 900 shows the quality of service (QoS %) metric between the EDA and GA algorithms for the 61-DRU problem, for example as discussed in FIGS. 6A and 6B. In this case, the EDA algorithm seem to reach a higher level of QoS, while it can be clearly seen that both methods drastically improve the QoS compared to if no techniques were performed. Chart 910 shows a number of block calls metric between the EDA and GA algorithms for the 61-DRU problem. As shown, the number of blocked calls is drastically reduced by implementing techniques of some embodiments, although the EDA algorithm seems to result in even fewer blocked calls. Chart 920 shows the number of handoffs occurring using both EDA and GA algorithms. Here, both algorithms generally result in a 93% reduction, or a fourteen-fold improvement, in the number of handoffs compared to using no techniques according to embodiments of the present invention.

Figure 10:
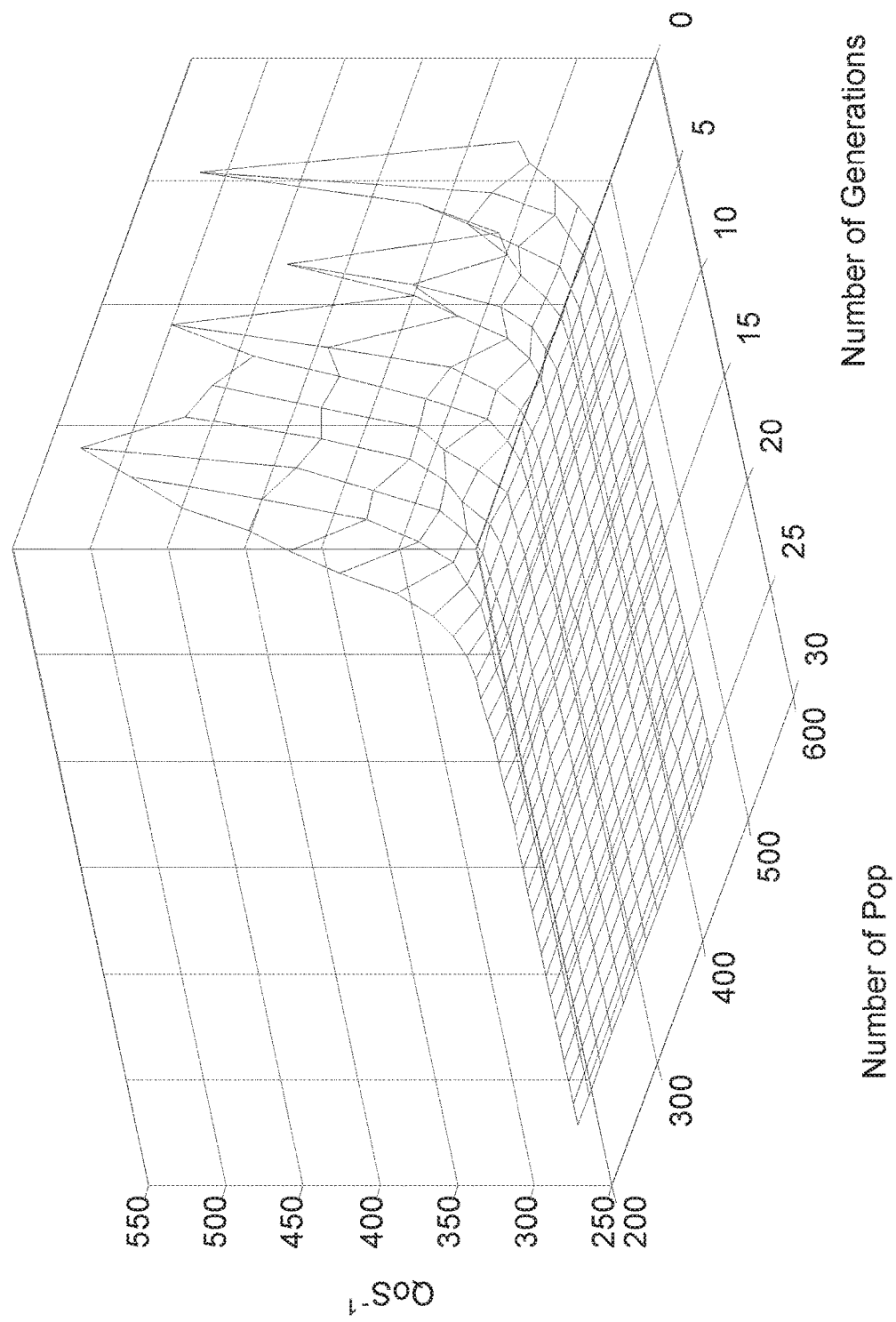
FIGS. 10, 11, and 12 show charts of example tradeoffs between the population size and the number of generation required to achieve a specified performance according to some embodiments.
Figure 11:
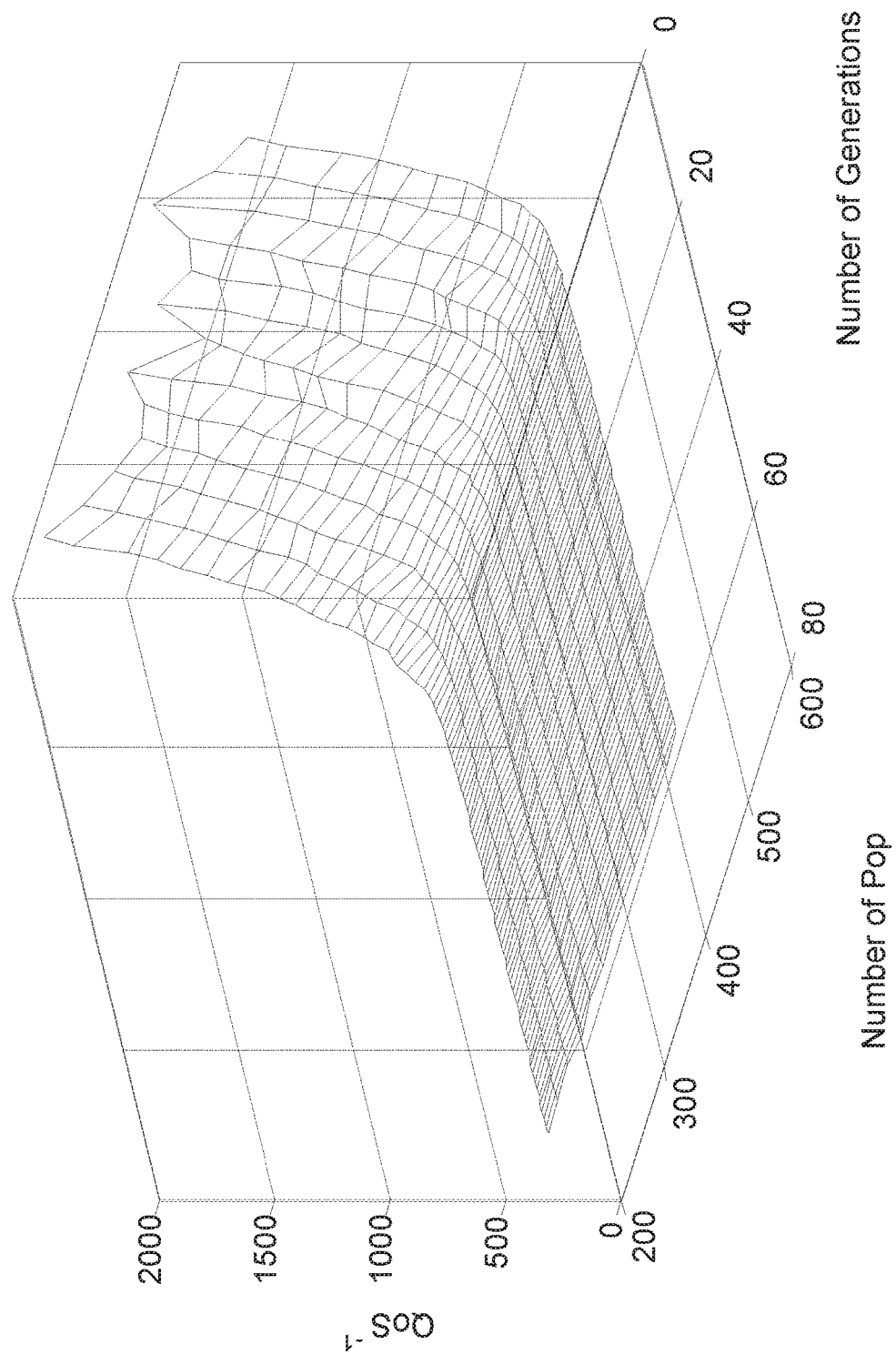
Figure 12:
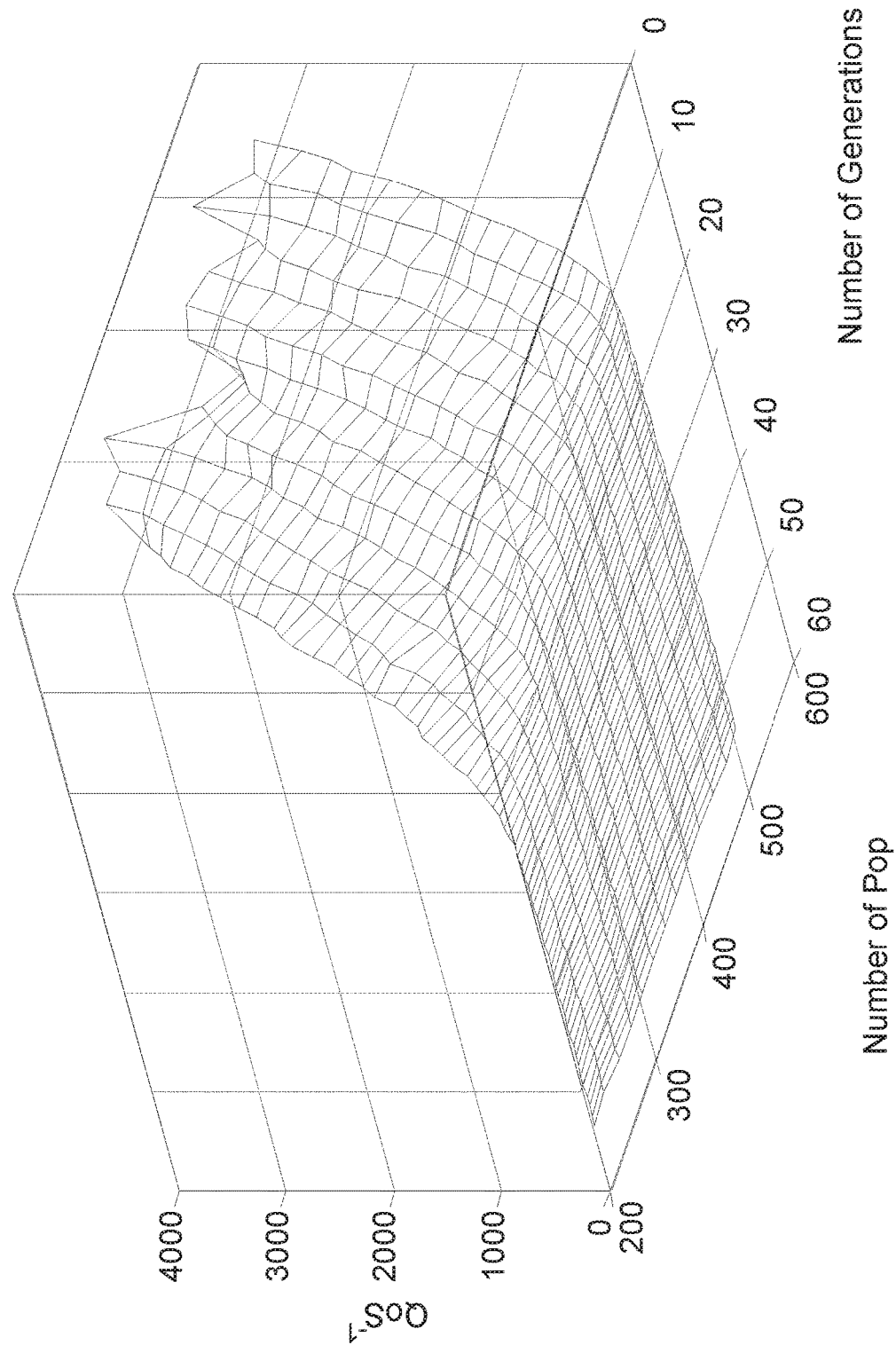

Obviously, these two algorithms are highly likely to yield a better solution if the algorithm runs more generations. Also, with the same number of generation, the algorithms are likely to produce a better solution if a larger population size is used in each generation. There is a tradeoff between the population size and the number of generation required to achieve a specified performance of the final solution. FIGS. 10, 11 and 12 show this trade off in three different scenarios solved using EDA. Specifically, FIG. 10 corresponds to the 19-DRU problem, FIG. 11 corresponds to the 37-DRU problem, and FIG. 12 corresponds to the 61-DRU problem. One can use this trade off to configure the algorithms to available hardware; e.g., for hardware with a large memory, a large population size is suitable.

Figure 13:
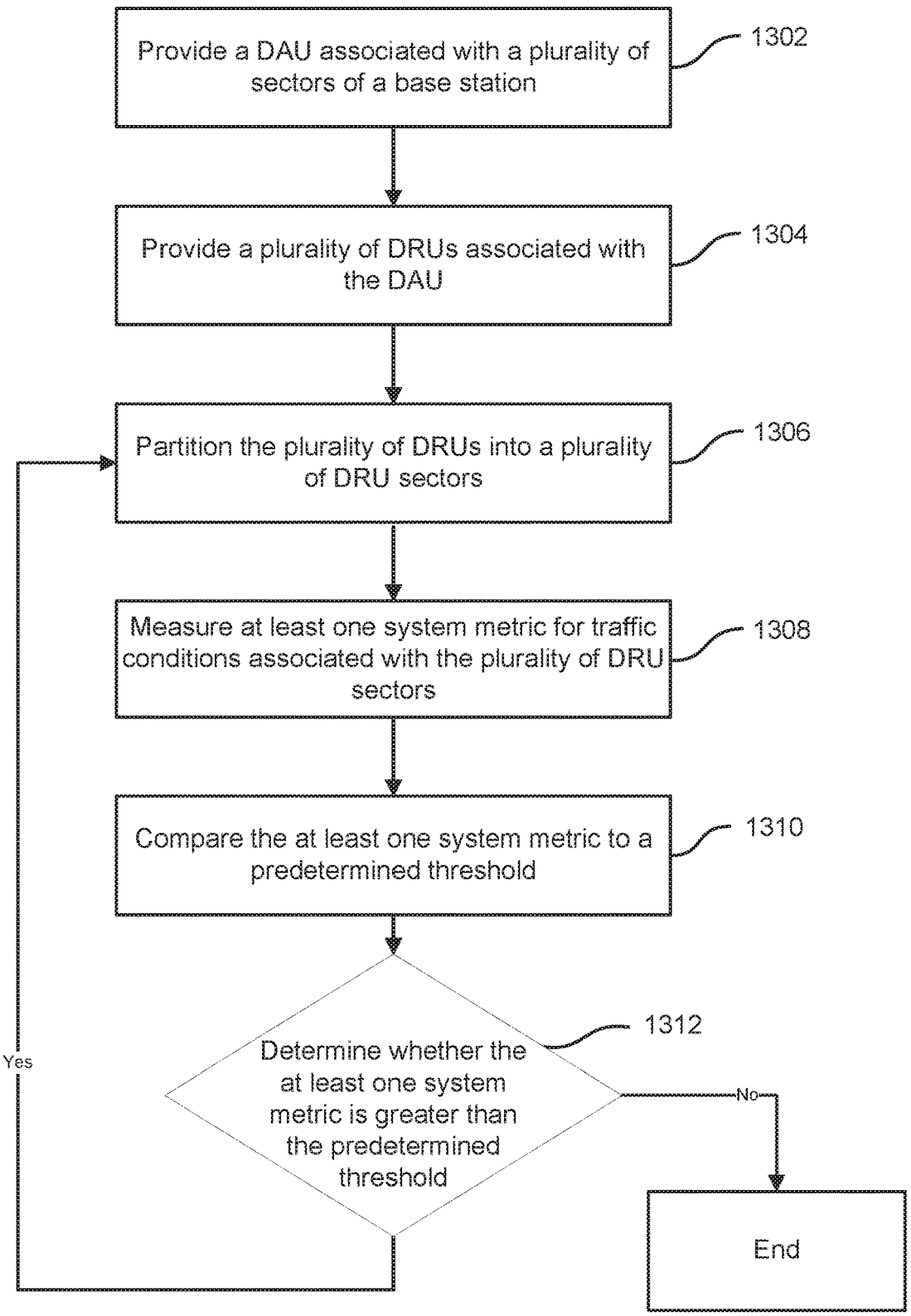
FIG. 13 shows an example flowchart according to some embodiments.

Referring to FIG. 13, flowchart 1300 shows an example methodology according to some embodiments. These descriptions may be consistent with any of the previous figures and descriptions discussed herein. The steps in flowchart 1300 may be implemented by various components discussed in FIG. 1, for example.

At block 1302, in some embodiments, the method may provide a DAU associated with a plurality of sectors of a base station. Examples of this provisioning may be shown in FIG. 1, for example. At block 1304, the method may provide a plurality of DRUs associated with the DAU. The DRUs may be located in physically distinct areas from each other, such as what is illustrated in FIGS. 1, 2A, 2B, and 3.

At block 1306, the plurality of DRUs may be partitioned into a plurality of DRU sectors. In some embodiments, the DRU sectors may each be associated with a distinct sector of the base station. In some embodiments, a plurality of base stations may be provided, wherein each base station has a plurality of sectors. In some embodiments, the DRUs may be partitioned into connected sectors. In some embodiments, the partitions may be substantially compact. The descriptions may be consistent with the concepts discussed in FIGS. 2A, 2B and 3, for example.

At block 1308, at least one system metric for traffic conditions may be measured. The system metric may be associated with the plurality of DRU sectors. In some embodiments, the at least one system metric may be a number of blocked calls in the DRU sector. In some embodiments, the at least one system metric may be a number of handoffs occurring along the border of the DRU sector. In some embodiments, the at least one system metric may be a QoS measurement.

At block 1310, the at least one system metric may be compared to a predetermined threshold. For example, the threshold may be 200 calls in a DRU sector, consistent with examples discussed in FIGS. 2A, 2B, and 3. Clearly, other thresholds may be used, including those discussed in relation to any of the other figures in the present disclosures.

At block 1312, it may be determined whether the at least one system metric is greater than the predetermined threshold. For example, the present number of total calls may be determined to be higher than the threshold 200 calls. If it is determined to be greater than the threshold, the method may iterate through the flowchart 1300 again, cycling back to block 1306. In the next iteration, the partitioning in block 1306 may be different than before. In some embodiments, the partitioning may be made according to an optimization algorithm, for example, any of the algorithms described in the present disclosures.

If it is determined that the system metric is lower than the threshold, then the method may end, for it may be determined that the system is in a balanced or properly sectorized state. In some embodiments, the method may continue to monitor traffic, and may cycle back to block 1306 whenever it is determined that the at least one system metric is greater than the predetermined threshold. It should be noted that the example method illustrated in FIG. 13 is suitable for repartitioning in order to drive the system metric to a level below the predetermined threshold. An example could be dynamic repartitioning through iteration to reduce the number of blocked calls to zero. In other implementations, repartitioning can be performed to drive the system metric to a value greater than a predetermined threshold. An example could be the QoS, which can be increased as iteration is performed to repartition the DRU sectors. It will be appreciated that the inverse of the metric could also be employed depending on whether the comparison in process 1312 is that the metric is greater than or less than the threshold. One of ordinary skill in the art would recognize many variations, modifications, and alternatives.

Various examples have been described. These and other examples are within the scope of the following claims.

What is claimed is:

1. A method comprising:
   providing a digital access unit (DAU) associated with a plurality of sectors of a base station, wherein the DAU is operable to receive signals from the base station;
   providing a plurality of digital remote units (DRUs) associated with the DAU, wherein the DAU assigns a plurality of radio resources associated with the plurality of sectors to the plurality of DRUs based on a measure of network traffic;
   partitioning the plurality of DRUs into a plurality of DRU groupings, wherein partitioning balances non-uniformly distributed network traffic;
   measuring at least one metric associated with the plurality of DRU groupings;

comparing the at least one metric to at least one threshold; and iterating the partitioning, measuring and comparing steps.

2. The method of claim 1, wherein measuring the at least one metric further comprises determining a compactness index of each sector of the plurality of DRU sectors.

3. The method of claim 2, wherein partitioning the plurality of DRUs comprises maximizing a compactness index of each sector of the plurality of DRU sectors.

4. The method of claim 1, wherein the at least one metric further comprises traffic conditions.

5. The method of claim 1, wherein the at least one metric further comprises a maximum number of users associated with a predetermined signal to noise ratio (SNR).

6. The method of claim 1, wherein iterating comprises utilizing at least one optimization algorithm.

7. The method of claim 6, wherein the at least one optimization algorithm is at least one of a Genetic Algorithm (GA) or an Estimation Distribution Algorithm (EDA).

8. The method of claim 1, wherein each sector of the plurality of DRU sectors comprises connected DRUs.

9. A system comprising:
digital access unit (DAU) associated with a plurality of sectors of a base station, wherein the DAU is operable to receive signals from the base station, and the DAU is configured to dynamically repartition cells of a distributed antenna system and to receive signals from a base station, the DAU comprising a data processor coupled to a non-transitory computer-readable storage medium comprising a plurality of computer-readable instructions tangibly embodied on the computer-readable storage medium, which, when executed by the data processor cause to be performed a method comprising:
providing a plurality of digital remote units (DRUs) associated with the DAU, wherein the DAU assigns a plurality of radio resources associated with the plurality of sectors to the plurality of DRUs based on a measure of network traffic;

partitioning the plurality of DRUs into a plurality of DRU groupings, wherein partitioning balances non-uniformly distributed network traffic;

measuring at least one metric associated with the plurality of DRU groupings;

comparing the at least one metric to at least one threshold;

determining that the at least one metric is greater than the at least one threshold; and iterating the above steps.

10. The DAU of claim 9, wherein the at least one metric further comprises traffic conditions.

11. The DAU of claim 9, wherein the instructions that cause the data processor to measure the at least one metric further comprise instructions for determining a compactness index of each sector of the plurality of DRU sectors.

12. The DAU of claim 11, wherein the instructions that cause the data processor to partition the plurality of DRUs comprise instructions for maximizing the compactness index of each sector of the plurality of DRU sectors.

13. The DAU of claim 9, wherein the at least one metric further comprises a maximum number of users associated with a predetermined signal to noise ratio (SNR).

14. The DAU of claim 9, wherein iterating comprises utilizing at least one optimization algorithm.

15. The DAU of claim 14, wherein the at least one optimization algorithm is at least one of a Genetic Algorithm (GA) or an Estimation Distribution Algorithm (EDA).

16. The DAU of claim 9, wherein each sector of the plurality of DRU sectors comprises connected DRUs.

* * * * *